US012773890B2

(12) United States Patent
Francis

(10) Patent No.: US 12,773,890 B2
(45) Date of Patent: Oct. 27, 2026

(54) EVAPORATOR EXPANSION VALVE STABLIZATION

(71) Applicant: THERMO KING LLC, Minneapolis, MN (US)

(72) Inventor: Sean Francis, Cologne, MN (US)

(73) Assignee: THERMO KING LLC, Minneapolis, MN (US)

( * ) Notice: Subject to any disclaimer, the term of this patent is extended or adjusted under 35 U.S.C. 154(b) by 152 days.

(21) Appl. No.: 18/622,086

(22) Filed: Mar. 29, 2024

(65) Prior Publication Data

US 2025/0303820 A1 Oct. 2, 2025

(51) Int. Cl.
*B60H 1/00* (2006.01)

(52) U.S. Cl.
CPC ..... *B60H 1/00885* (2013.01); *B60H 1/00735* (2013.01); *B60H 2001/00942* (2013.01)

(58) Field of Classification Search
CPC ............ B60H 1/00885; B60H 1/00735; B60H 2001/00942; B60H 2001/3263; B60H 2001/3264; B60H 2001/3285; F25B 2600/2501; F25B 2600/2513
See application file for complete search history.

(56) References Cited

U.S. PATENT DOCUMENTS

| | | | | |
|---|---|---|---|---|
| 9,163,865 | B2 | 10/2015 | Wakamoto et al. | |
| 2014/0290292 | A1* | 10/2014 | Kato | F25B 40/00 62/190 |
| 2020/0256590 | A1* | 8/2020 | Nishiyama | F25J 1/0261 |

FOREIGN PATENT DOCUMENTS

| | | |
|---|---|---|
| EP | 3320277 | 8/2023 |
| WO | 2011/064927 | 6/2011 |

OTHER PUBLICATIONS

Extended European Search Report, issued in the corresponding European patent application No. 25166984.2, dated Sep. 18, 2025, 11 pages.

* cited by examiner

*Primary Examiner* — Marc E Norman
(74) *Attorney, Agent, or Firm* — HSML P.C.

(57) ABSTRACT

A method for controlling a climate control circuit includes detecting one or more operating parameters of an evaporator expansion valve ("EXV") in the climate control circuit, and determining operation stability of the EXV based on the one or more operating parameters of the EXV. The method also includes opening a bypass pathway in response to determining the operation of the EXV is unstable, the bypass pathway includes an intermediate heat exchanger and a second expansion valve disposed in parallel with the first expansion valve, such that the intermediate heat exchanger cools a first portion of the working fluid flowing into the EXV using a second portion of the working fluid. A climate control system includes a climate control circuit, one or more sensors for the climate control circuit, and a climate controller to control the climate control circuit based on stability of an EXV in the climate control circuit.

20 Claims, 12 Drawing Sheets

EVAPORATOR EXPANSION VALVE STABLIZATION

FIELD

This disclosure relates to operation of a climate control circuit in a climate control system. More specifically, this disclosure relates to operation of expansion valves in a climate control circuit of a climate control circuit.

BACKGROUND

A climate control system is generally used to condition a climate controlled space. For example, a climate control system can be a transport climate control system used to control an environmental condition (e.g., temperature, humidity, air quality, and the like) within a transport unit (e.g., a container (such as a container on a flat car, an intermodal container, etc.), a truck, a box car, or other similar transport unit). In some embodiments, the transport unit can be a transit vehicle (e.g., a mass transit vehicle like a passenger bus) include a heating, ventilation, air conditioning, and conditioning ("HVAC") system to control a climate within a passenger space of the transit vehicle. In yet some other embodiments, the climate control system may be a heating, ventilation, refrigeration, air conditioning, and conditioning ("HVARC") system used to condition a climate controlled space within a building (e.g., interior space of an office building, interior of a home, etc.).

The climate control system can include a climate control circuit for providing heating and/or cooling within the climate controlled space. The climate control system can include, without limitation, a climate control circuit with a compressor, a condenser, an expansion valve, and an evaporator. A working fluid flows through the climate control circuit. In some configurations, a climate control circuit may also include an economizer heat exchanger and economizer expansion valve to provide intermediate working fluid (e.g., intermediate pressure working fluid) to the compressor to, for example, increase capacity of the compressor.

SUMMARY

This disclosure relates to operation of a climate control circuit in a climate control system. More specifically, this disclosure relates to operation of expansion valves in a climate control circuit of a climate control circuit.

In particular, the embodiments described herein can be directed to control of a climate control system that includes an evaporator expansion valve and a second expansion valve.

Climate control circuits can include an evaporator expansion valve that expands working fluid prior to flowing into an evaporator. The evaporator expansion valve ("EXV") controls flow of the working fluid into the evaporator. An EXV can be controlled based on superheat of the working fluid discharged from the evaporator (i.e., evaporator superheat). For example, a valve position of the EXV (e.g., the flowrate of working fluid through the EXV) can be adjusted based on a target evaporator superheat (e.g., predetermined target evaporator superheat). The embodiments described herein can, in some configurations and/or operating conditions where the subcooling of the working fluid flowing into the EXV valve may be relatively low, prevent unstable control of the EXV (e.g., controlling of the EXV based on evaporator superheat results in significant modulation of the EXV).

In an embodiment, a method is directed to controlling a climate control circuit. The method includes detecting one or more operating parameters of an evaporator expansion valve ("EXV") in the climate control circuit, and determining operation stability of the EXV based on the one or more operating parameters of the EXV. The method also includes in response to determining the operation of the EXV is unstable, opening a bypass pathway that includes an intermediate heat exchanger and a second expansion valve disposed in parallel with the first expansion valve. The opening of the bypass pathway includes cooling, in the intermediate heat exchanger, a first portion of the working fluid that flows into the EXV using a second portion of the working fluid flowing through the bypass pathway.

In an embodiment, a climate control system for conditioning a climate controlled space includes a climate control circuit, one or more sensors for the climate control circuit, and a climate controller configured to control the climate control circuit. The climate control circuit includes a compressor, a condenser, an intermediate heat exchanger, an EXV, an evaporator, and a second expansion valve. A working fluid flows through the climate control circuit. The climate controller is configured to detect, via the one or more sensors, one or more operating parameters of the EXV and to determine operation stability of the EXV based on the one or more operating parameters of the EXV. The climate controller is also configured to in response to determining that the operation of the EXV is unstable, open a bypass pathway. The bypass pathway includes the intermediate heat exchanger and the second expansion valve disposed in parallel with the evaporator expansion valve. The opening of the bypass pathway results in the intermediate heat exchanger cooling a first portion of the working fluid that flows into the EXV using a second portion of the working fluid flowing through the bypass pathway.

DRAWINGS

References are made to the accompanying drawings that form a part of this disclosure and which illustrate embodiments in which the systems and methods described in this specification can be practiced.

Like numbers represent like features.

DETAILED DESCRIPTION

This disclosure relates to operation of a climate control circuit in a climate control system. More specifically, this disclosure relates to operation of expansion valves in a climate control circuit of a climate control circuit.

In particular, the embodiments described herein can be directed to control of a climate control system that includes an evaporator expansion valve and a second expansion valve.

Figure 1:
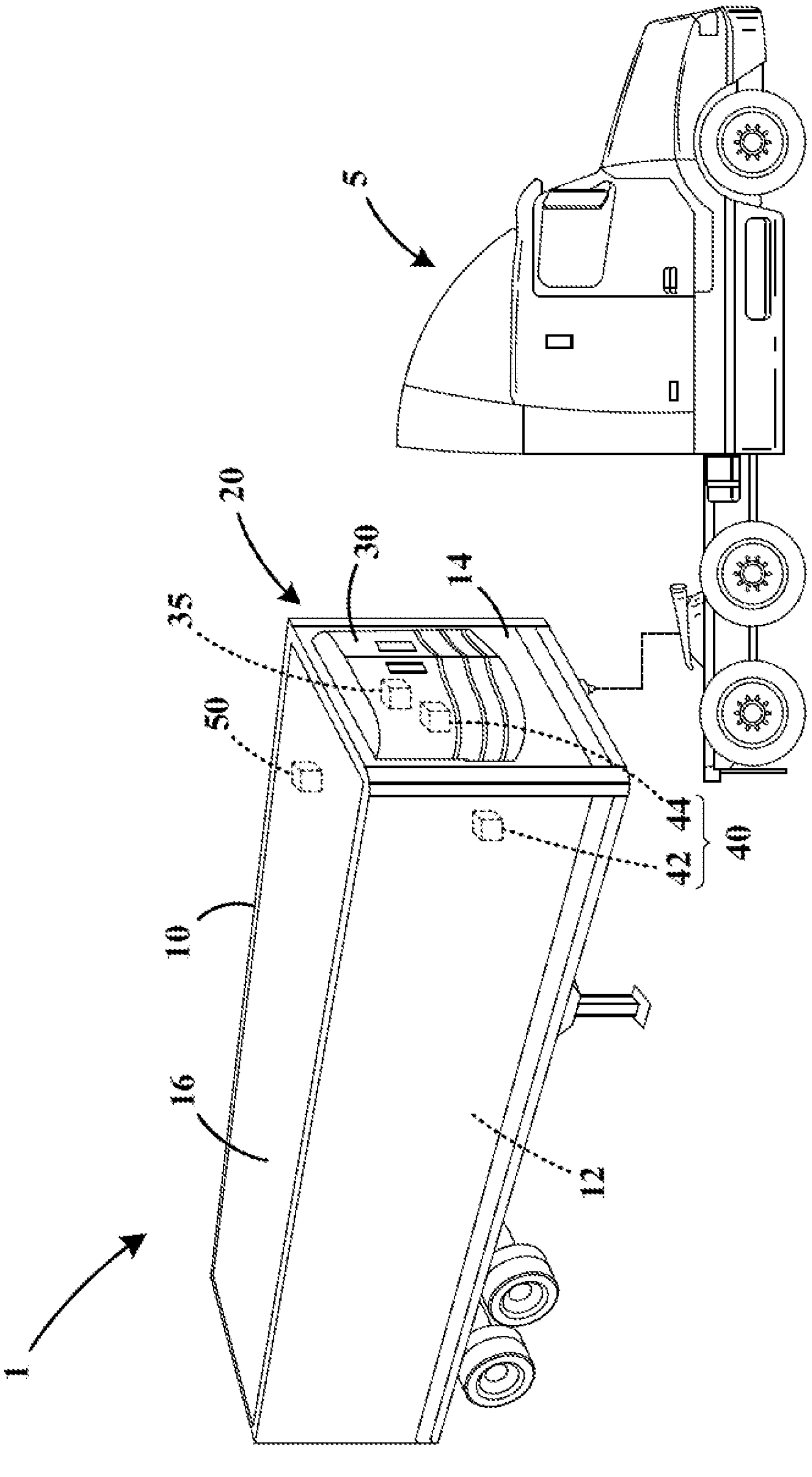
FIG. 1 is a perspective view of an embodiment of a climate controlled transport unit attached to a tractor.

FIG. 1 illustrates one embodiment of a climate controlled transport unit 1 attached to a tractor 5. The climate controlled transport unit 1 includes a transport unit 10 and a transport climate control system ("TCCS") 20 for the transport unit 10. Dashed lines are used in FIG. 1 to illustrate features that would not be visible in the view shown. The transport unit 10 may be attached to the tractor 5 that is configured to tow the transport unit 10 to and from different locations. When not being transported, the transport unit 10 may be parked and unattached from the tractor 5. It will be appreciated that the embodiments described herein are not limited to tractor and trailer units, but can apply to any type of transport unit such as a container (e.g., a container on a flat car, an intermodal container, etc.), a truck, a box car, a commercial passenger vehicle (e.g., school bus, railway car, subway car, etc.), or other similar transport unit.

The TCCS 20 includes a climate control unit ("CCU") 30 that provides environmental control (e.g., temperature, humidity, air quality, etc.) within a climate controlled space 12 of the transport unit 10. The climate controlled space 12 is an internal space of the transport unit 10. The CCU 30 provides conditioned air into the climate controlled space 12 of the transport unit 10 to provide a desired conditioned environment for the goods being held within the climate controlled space 12 of the transport unit 10. The desired conditioned environment for the climate controlled space 12 can have one or more desired environmental conditions (e.g., temperature, humidity, air quality, etc.). For example, the CCU 30 may provide cooled air to the climate controlled space 12 when perishable goods are being kept within the transport unit 10. In another example, the CCU may dehumidify the air within the climate controlled space 12 of the transport unit 10 when electronics are within the transport unit 10. The CCU 30 includes a climate control circuit 35 for providing conditioned air to the climate controlled space 12.

The CCU 30 is disposed on a front wall 14 of the transport unit 10. In other embodiments, it will be appreciated that the CCU 30 can be disposed, for example, on a roof 14 or another wall of the transport unit 10. The climate controlled transport unit 1 can include a battery (not shown), an internal combustion engine (not shown), or a both as a power source. The TCCS 20 may be a hybrid power system that uses a combination of battery power and engine power, an electric power system that does not include or rely upon an internal combustion engine of the TCCS 20 or the tractor 5 for power, or may be an electric power system that relies on electrical power from the tractor 5 (e.g., power generated by an internal combustion engine of the tractor 5, power from a battery of the tractor 5, or the like).

The TCCS 20 also includes a programmable climate controller 40 and one or more sensors 50. The sensor(s) 50 are configured to measure one or more parameters of the climate controlled transport unit 1 (e.g., an ambient temperature and/or ambient humidity outside of the transport unit 10, an evaporator discharge temperature, an evaporator discharge pressure, a temperature of air supplied into the climate controlled space 12 by the CCU 30, a temperature of air returning from the climate controlled space 12 to the CCU 30, an evaporator expansion valve inlet temperature, an evaporator expansion valve inlet pressure, etc.) and communicate parameter data to the climate controller 40. The climate controller 40 is configured to control operation of the TCCS 20 including components of the climate control circuit. The climate controller 40 may be a single integrated control unit 42 or a control unit formed by a distributed network of climate controller elements 42, 44. The number of distributed control elements in a given network can depend upon the particular application of the principles described herein.

The climate controlled transport unit 1 shown in FIG. 1 is a type configured to be attached to a tractor 5 (i.e., a tractor-trailer type of climate controlled transport unit). It should be appreciated that concepts discussed herein for a climate controlled transport unit 1 and/or for the TCCS 20 may be similarly applied to the other types of transport units, such as (but not limited to), a climate-controlled van, a climate-controlled straight truck, a transport controlled vehicle (e.g., school bus, railway vehicle, subway car, or other commercial vehicle that carries passengers), etc.

Figure 2A:
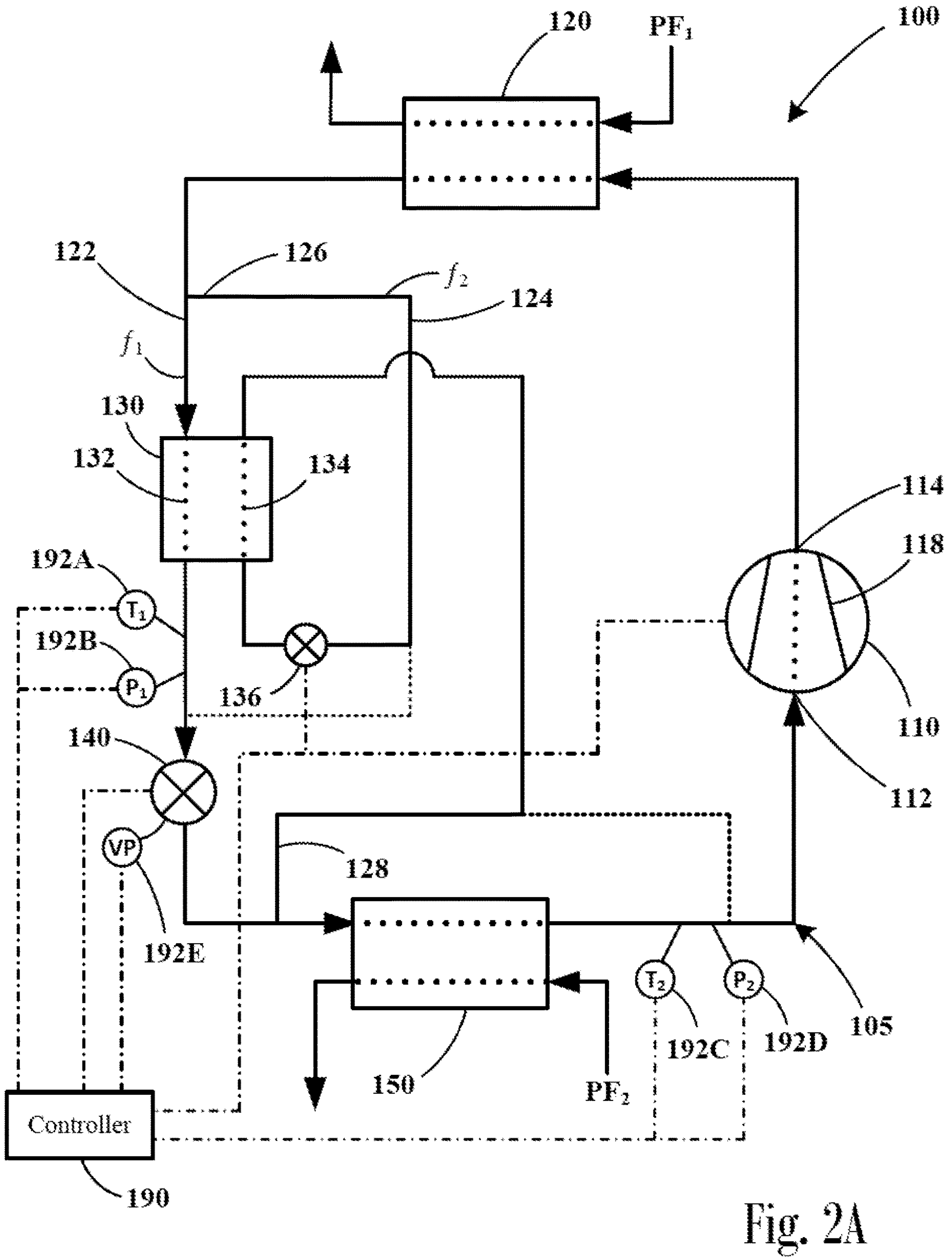
FIG. 2A is schematic diagram of an embodiment of a climate control system including a climate control circuit operating in a first mode.
Figure 2B:
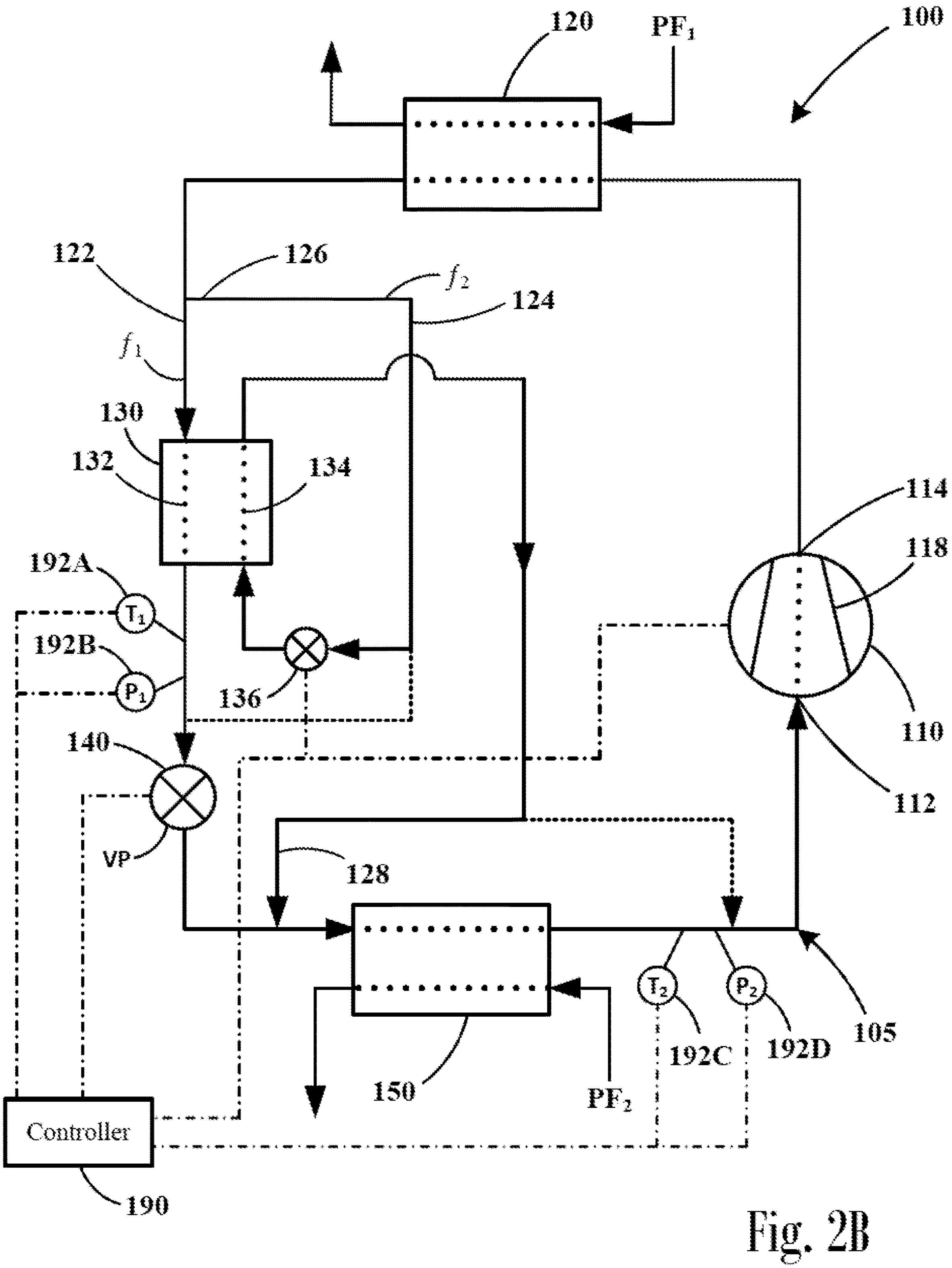
FIG. 2B is schematic diagram of the climate control circuit of FIG. 2A having the climate control circuit operating in a second mode, according to an embodiment.

FIGS. 2A and 2B show schematic diagrams of an embodiment of a climate control system ("CCS") 100. The CCS 100 includes a climate control circuit 105. FIG. 2A shows the climate control circuit 105 operating in a first mode, and FIG. 2B shows the climate control circuit 105 operating in a second mode. In an embodiment, the CCS 100 may be a transport climate control system (e.g., the TCCS 10 in FIG. 1, etc.) that conditions a climate controlled space (e.g., climate controlled space 12 in FIG. 1, etc.). In another embodiment, the CCS 100 may be a heating, ventilation, and air conditioning ("HVAC") system configured to condition a climate controlled space(s) within a transit vehicle. In yet another embodiment, the CCS 100 may be a heating, ventilation, air conditioning, and refrigeration ("HVACR") system configured to condition climate controlled space(s) within a building.

The CCS 100 includes a climate control circuit 105 that is utilized to condition the climate controlled space (e.g., climate controlled space 12 in FIG. 1, climate controlled space(s) of a building, etc.). For example, the climate control circuit 105 may have a heating mode configured to heat the climate controlled space and/or in a cooling mode configured to heat the climate controlled space. A working fluid flows through climate control circuit 105. For example, the working fluid includes refrigerant (e.g., a single refrigerant, a blend of refrigerants). In an embodiment, when the CCS 100 is a TCCS, the climate control circuit 105 can be disposed in a CCU of the TCCS (e.g., in the CCU 30 in FIG. 1, etc.).

The climate control circuit 105 includes a compressor 110, a condenser 120, an intermediate heat exchanger 130, a first expansion valve 140, and an evaporator 150. The climate control circuit 105 also includes a bypass expansion valve 136. The first expansion valve 140 can also be referred to as the evaporator expansion valve ("EXV"). The bypass expansion valve 136 can also be referred to as a bypass expansion valve. In an embodiment, the climate control circuit 105 can be modified to include additional components, such as, for example, one or more additional valve(s), sensor(s), a distributor, an accumulator tank, a filter drier, a receiver tank, an overflow tank, an economizer subcooler (e.g., a cooling heat exchanger upstream of an economizer to provide pre-cooling utilizing air, utilizing working fluid downstream of the evaporator, etc.), etc. The components of the climate control circuit 105 are fluidly connected.

Operation of the climate control circuit 105 is controlled by a programmable climate controller 190. The climate controller 190 is configured to control operation of the CCS 100 and its components. In FIGS. 2A and 2B, the climate controller 190 is shown as a single integrated control unit. However, it will be appreciated that the climate controller 190 in an embodiment may a single integrated control unit or a distributed network of climate controller elements (e.g., distributed network of climate controller elements 42, 44 in FIG. 1, etc.).

Dotted lines are provided in FIGS. 2A-3B to indicate fluid flows through various components (e.g., compressor 110, condenser 120, evaporator 150 in FIGS. 2A and 2B) for clarity, and should be understood as not specifying a particular route within each component. Dashed lines are provided in FIGS. 2 and 3 to indicate alternative/optional features in some embodiments. It should be appreciated that alternative/optional features in other embodiments are not limited to those indicated in dashed lines. Dashed dotted lines are provided in FIGS. 2 and 3 to illustrate electronic communications between different components. For example, a dashed dotted line extends from the climate controller 190 to the EXV 140 as the climate controller 190 is configured to control a valve position of the EXV 140 (e.g., opening/closing of the EXV 140). For example, a dashed dotted line extends from the climate controller 190 to sensors 192A-192E as the climate controller can use the sensors 192A-192E to detect operational parameters of the climate control circuit 105, as discussed below. For example, a dashed dotted line extends from the climate controller 190 to compressor 110 as the climate controller can control operation of the compressor (e.g., adjust the speed of the compressor, adjust the speed of the motor (not shown) of the compressor 110, etc.).

The climate controller 190 is configured to detect various operating parameters of the climate control circuit 105. The CCS 100 can include one or more sensor(s) 192A, 192B, 192C, 192D for detecting one or more operating parameter(s) of the climate control circuit 105. The CCS 100 can include one or more sensor(s) 192A, 192B, 192C, 192D for detecting operating parameters of the EXV 140. For example, in the illustrated embodiment of FIG. 2A, the sensor(s) can include one or more of a temperature sensor 192A for detecting a EXV inlet temperature $T_1$, a pressure sensor 192B for detecting a EXV inlet pressure $P_1$, an evaporator outlet temperature $T_2$, an evaporator outlet pressure $P_2$, and/or a valve position sensor 192E for detecting a valve position VP of the EXV 140. In an embodiment, the EXV 140 may be a stepper valve, and the controller 190 may be configured to determine a valve position VP of the EXV 140 based on recording steps of stepper valve from a known position (e.g., a zero position, the closed position, the fully open position, etc.). The operation of the EXV 140 is discussed in more detail below. In an embodiment, the climate controller 190 includes a memory (not show) for storing information and a processor (not shown).

In an embodiment, the climate control circuit 105 is configured to operate in a cooling mode to provide cooling to the climate controlled space. In FIGS. 2A and 2B, the climate control circuit 205 heats a first process fluid $PF_1$ and cools a second process fluid $PF_2$. The climate control circuit 105 cools the second process fluid $PF_2$, and the cooled second process fluid $PF_2$ is used to provide cooling to the climate controlled space. For example, the second process fluid $PF_2$ can be air (e.g., return air, ambient air, a mixture of ambient and return air, etc.) supplied to a conditioned space, or an intermediate fluid (e.g., a solution including water, glycol, etc., chiller water, etc.) that cools air supplied to a conditioned space or is supplied to the conditioned space to cool the air within the conditioned space. Generally, when operating in a cooling mode, the flow path in the climate control circuit 105 for the working fluid is from the compressor 110 to the condenser 120, from the condenser 120 to the EXV 140, from the EXV 140 to the evaporator 150, and from the evaporator 150 back to the compressor 110.

Beginning at the compressor 110, the compressor 110 includes a suction inlet 112, a discharge outlet 114, a compression mechanism 118 (e.g., one or more rotatable/orbitable scroll(s), piston(s), screw(s), etc.). The compression mechanism 118 of the compressor 110 operates to compress working fluid. (e.g., includes a motor (not shown) (e.g., electrical motor, internal combustion motor, etc.) that drives the compression mechanism 118 to compress working fluid). Working fluid in a lower pressure gaseous state or mostly gaseous state is suctioned into the compressor 110 via its suction inlet 112. The working fluid is compressed as it flows through the compressor 110 (i.e., is compressed by the compression mechanism 118). The compressed working fluid is discharged from the compressor 110 via its discharge outlet 114 and flows to the condenser 120.

The condenser 120 cools the compressed working fluid as it passes through the condenser 120. The first process fluid $PF_1$ flows through the condenser 120 separate from the working fluid. The condenser 120 is a heat exchanger that allows the working fluid and the first process fluid $PF_1$ to be in a heat transfer relationship without physically mixing as they each flow through the condenser 120. As the working fluid and first process fluid $PF_1$ flow through the condenser 120, the first process fluid $PF_1$ absorbs heat from the working fluid which cools the working fluid. The working fluid is cooled by the condenser 120 and becomes liquid or mostly liquid as it passes through the condenser 120. The working fluid is discharged from the condenser 120 and the discharged working fluid flows from the condenser 120 to the EXV 140. As shown in FIG. 2A, the discharged working fluid flows from the condenser 120 to the EXV 140 through the intermediate heat exchanger 130.

The EXV 140 expands the (cooled) working fluid from the condenser 120 as it passes therethrough. The expansion causes the working fluid to decrease in temperature. The expanded working fluid can be in a two-phase gaseous/liquid phase. The expanded gaseous/liquid working fluid flows from the EXV 140 to the evaporator 150.

The EXV 140 is an electronic expansion valve with an opening that is adjustable to change the flowrate of working fluid flowing through the EXV 140. For example, the climate controller 190 is configured to control the opening of the EXV 140 based on the superheat of the working fluid discharged from the evaporator 150. For example, the climate controller 190 can be configured to control the opening of the EXV 140 (e.g., select its open valve position) so that the working fluid discharged from the evaporator 150 at a predetermined amount/range of superheat. In one example, the climate controller 190 can be configured to control the opening/position of the EXV 140 such that a temperature $T_2$ of the working fluid discharged from the evaporator 150 is at a target temperature/range (e.g., a target temperature/range that corresponds with the predetermined amount/range of superheat). The working fluid flows from the EXV 140 to the evaporator 150. As known in the art of climate control circuits, "superheat" refers to a number of degrees above the saturation or dew point temperature of the working fluid (i.e., superheat=working fluid temperature−saturation or dew point temperature of the working fluid).

The evaporator 150 heats the (expanded) working fluid as it passes through the evaporator 150. The second process fluid $PF_2$ separately flows through the evaporator 150. The evaporator 150 is a heat exchanger that allows the working fluid and the second process fluid $PF_2$ to be in a heat transfer relationship without physically mixing as they each flow through the evaporator 150. As the working fluid and second process fluid $PF_2$ each flow through the evaporator 150, the working fluid absorbs heat from the second process fluid $PF_2$ which cools the second process fluid $PF_2$. The working fluid is heated by the evaporator 150 and becomes gaseous or mostly gaseous as it passes through the evaporator 150. The heated working fluid flows from the evaporator 150 back to the suction inlet 112 of compressor 110.

The climate control circuit 105 includes the bypass expansion valve 136. The climate control circuit includes a first pathway 122 and a second pathway 124. The first pathway 122 extends from the condenser 120 to the evaporator 150. The first pathway 122 includes the intermediate heat exchanger 130 and the evaporator expansion valve 140 (e.g., the first pathway 122 extends through the intermediate heat exchanger 130 and the EXV 140). The first pathway 122 may be the main pathway of the climate control circuit 105 that extends from the discharge outlet 114 of the compressor 110; through the condenser 120, the EXV 140, and the evaporator 150; and to the suction inlet 112 of the compressor 110.

The second pathway 124 extends from the first pathway 122 back to the first pathway 122. The second pathway 124 bypasses a portion of the first pathway 122. As shown in FIG. 2A, the second pathway bypasses at least the EXV 140. In the illustrated embodiment, the second pathway 124 can also be referred to as a bypass pathway.

The bypass pathway 124 has an inlet 126 that connects (i.e., fluidly connected) to the first pathway 122 and an outlet 128 that connects (i.e., fluidly connected) to the first pathway 122. The inlet 126 of the bypass pathway 124 connects to the first pathway 122 downstream of the condenser 120 and upstream of the EXV 140 (e.g., upstream of the intermediate heat exchanger 130). In another embodiment, the inlet 126 of the bypass pathway 124 may connect to the first pathway 122 downstream of intermediate heat exchanger 130 and upstream of the EXV 140 (e.g., as shown in dashed lines in FIG. 2A).

The outlet 128 of the bypass pathway 124 connects to the first pathway 122 downstream of EXV 140 and upstream of the compressor 110 (e.g., upstream of the suction inlet 112 of the compressor 110). For example, as shown in FIG. 2A, the outlet 128 of the bypass pathway 124 can connect to the first pathway upstream of the evaporator 150. In another embodiment, the outlet 128 of the bypass pathway 124 may connect to the first pathway 122 downstream of evaporator 150 (e.g., as shown in dashed lines in FIG. 2A).

The bypass pathway 124 bypasses the EXV 140. The bypass pathway 124 includes the intermediate heat exchanger 130 and the bypass expansion valve 136 (e.g., the bypass pathway 124 extends through the intermediate heat exchanger 130 and the bypass expansion valve 136). The bypass expansion valve 136 may also be referred to as a bypass expansion valve.

The first and second pathways 122, 124 separately extend through the intermediate heat exchanger 130. For example, the intermediate heat exchanger 130 includes a first side 132 and a second side 134, and the first pathway extends through the first side 132 of the intermediate heat exchanger 130 and the second pathway extends through the second side 134 of the intermediate heat exchanger 130. It should be understood that a "side" in a heat exchanger (e.g., in the intermediate heat exchanger 130, etc.) refers to a separate flow passageway through the heat exchanger, and does not refer to a particular physical orientation. The first pathway 122 extends through the first side 132 of the intermediate heat exchanger 130 and the second pathway 124 extends through the second side 134 of the intermediate heat exchanger 130.

In the first mode as shown in FIG. 2A, no working fluid (i.e., no substantive amount of working fluid) flows through the bypass pathway 124. The controller 190 controls flow through the second pathway 124 based on functioning of the EXV 140. For example, the controller 190 adjusts the bypass expansion valve 136 (e.g., opens the bypass expansion valve 136) based on functioning of the EXV 140. In the illustrated embodiment, the controller 190 closes the bypass pathway 124 by closing the bypass expansion valve 136. In an embodiment, the bypass pathway 124 may include a shutoff valve (not shown) for blocking through the bypass pathway 124, and the bypass pathway 124 may be opened/closed by controlling the shutoff valve (i.e., closing the shutoff valve). Control of flow through the bypass pathway 124 is discussed in more detail below.

FIG. 2A illustrates an embodiment of the climate control circuit 105 in which working fluid flows through the intermediate heat exchanger 130 when not operating (i.e., not being used to provide cooling). It should be appreciated that the CCS 100 may include an intermediate heat exchanger bypass (not shown) that routes the discharge of the condenser 120 to the EXV 140 without passing through the intermediate heat exchanger 130 (e.g., a bypass for the intermediate heat exchanger 130). The CCS 100 may be configured to route/direct the working fluid through the intermediate heat exchanger bypass in the first mode of FIG. 2A.

FIG. 2B shows the climate control circuit 105 operating in the second mode. In the second mode, the working fluid flows through the bypass pathway 124. Relative to the first mode in FIG. 2A, the climate controller 190 opens the bypass pathway 124 to allow flow through the bypass pathway 124 (e.g., opens the bypass expansion valve 136 and/or the shutoff valve in the second pathway (not shown)). The second mode of the CCS 100 may also be referred to as a bypass mode.

The climate controller 190 in the second mode may be configured to adjust the bypass expansion valve 136 to a preset open position (e.g., a predetermined open position). For example, the preset open position may be an open position that is previously known (e.g., known based on previous testing and/or modeling of the climate control circuit 105 or of a climate control circuit with a similar configuration) to stabilize operation of the EXV 140. This stabilizing of the operation of the EXV can be configured to mitigate the instability that can result from by a relatively low EXV inlet subcooling. In another embodiment, the climate controller 190 may be configured to adjust the EXV 140 to variable open position that is adjusted based on one or more operational conditions of climate control circuit 105 (e.g., compressor speed, one or more of the operational condition(s) used to determine unstable operation of the climate control circuit 105, etc.)

In FIG. 2B, a first portion $f_1$ of the working fluid discharged from the condenser 120 flows through the intermediate heat exchanger 130 and the EXV 140 and a second portion $f_2$ of the working fluid discharged from the condenser 120 flows through the intermediate heat exchanger 130 and the bypass expansion valve 136. The climate controller 190 is configured to open the bypass pathway 124 (i.e., switch from the first mode to the second mode) based on determining unstable operation of the EXV 140. The determination/detection of unstable operation of the EXV 140 is discussed in more detail below.

The bypass expansion valve 136 expands the working fluid in the second portion $f_2$ as it passes therethrough, and the expansion causes the working fluid in the second portion $f_2$ to decrease in temperature. The expanded working fluid in the second portion $f_2$ flows from the bypass expansion valve 136 to the intermediate heat exchanger 134. The first portion $f_1$ flows through the first side 132 of the intermediate heat exchanger 130 and the second portion $f_2$ flows through the second side 134 of the intermediate heat exchanger 130. The expanded working fluid in the second portion $f_2$ absorbs heat from the working fluid in the first portion $f_1$ which cools the working fluid in the first portion $f_1$. In the second mode in FIG. 2B, the intermediate heat exchanger 130 cools the working fluid that flows into EXV 140 (e.g., cools the working fluid flowing from the condenser 120 into the EXV 140, cools the first portion $f_1$ of working fluid). The operation of the intermediate heat exchanger 130 increases a subcooling of the working fluid flowing into the EXV 140. As known in the art of climate control circuits, "subcooling" refers to a number of degrees below a saturation or bubble point temperature of the working fluid (i.e., subcooling=saturation or bubble point temperature of the working fluid−working fluid temperature). The increase in the subcooling of the working fluid can stabilize the operation of the EXV 140.

Figure 3A:
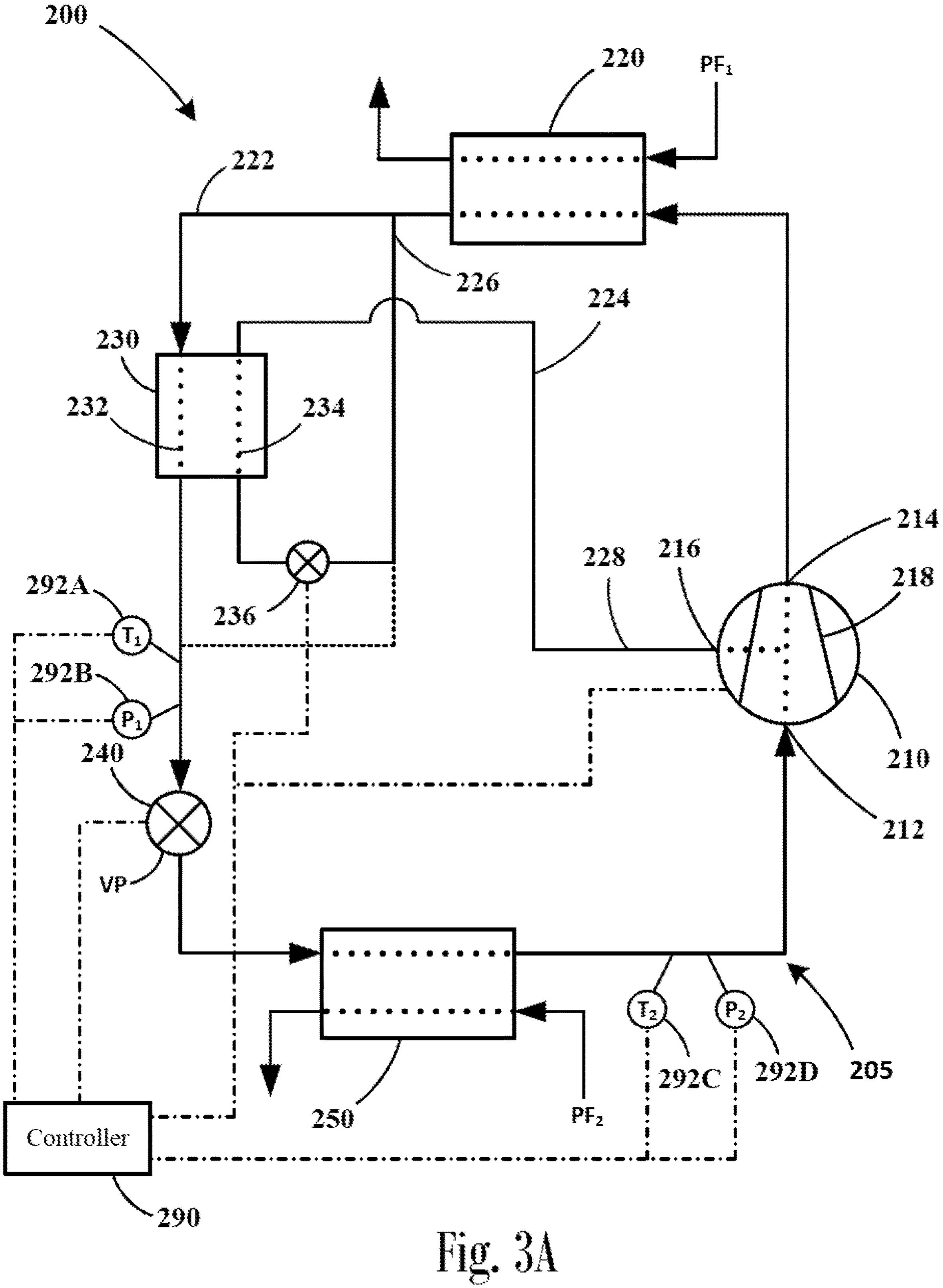
FIG. 3A is schematic diagram of another embodiment of a climate control system including a climate control circuit operating in a first mode.
Figure 3B:
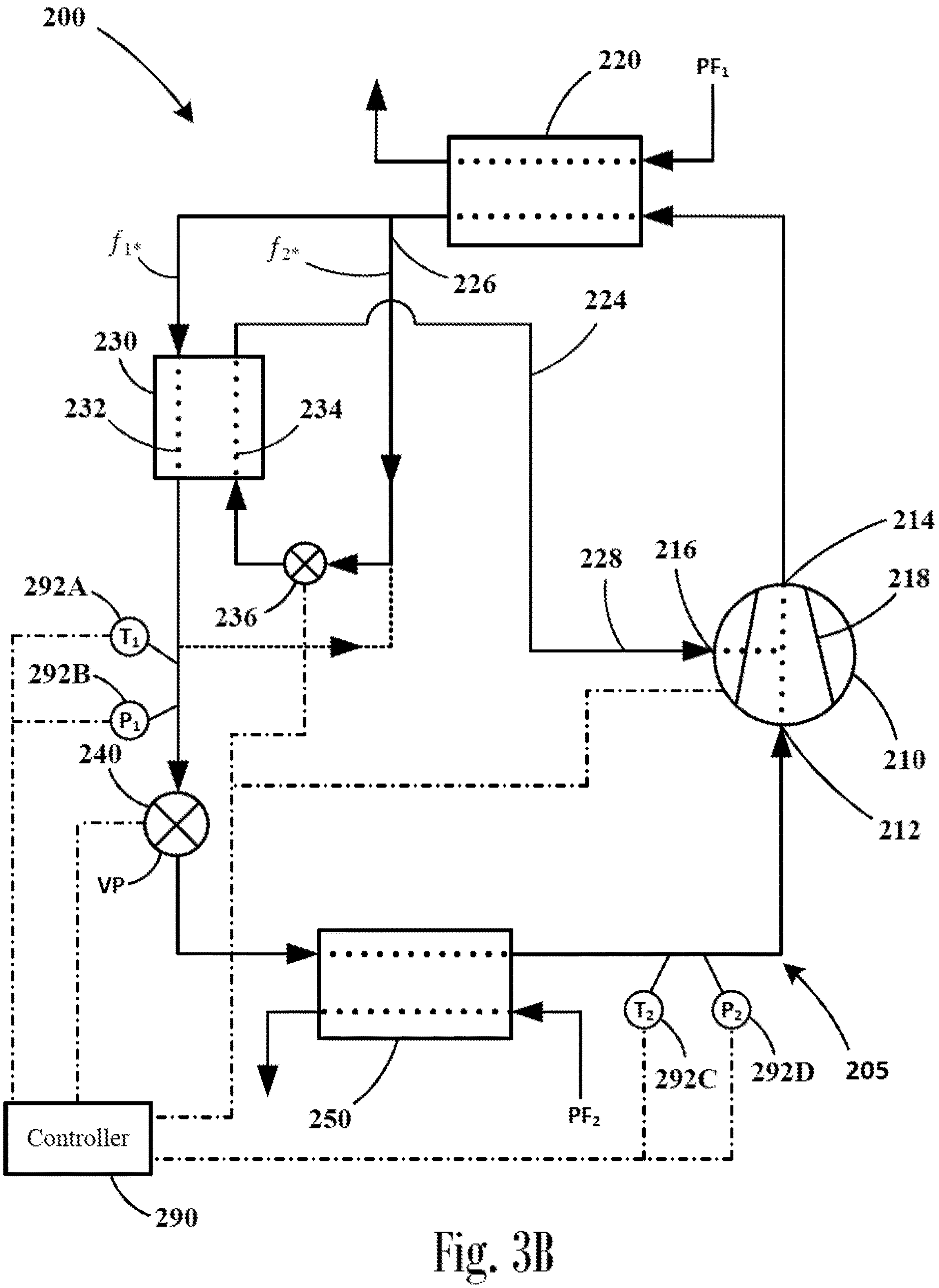
FIG. 3B is schematic diagram of the climate control circuit of FIG. 3A having the climate control circuit operating in a second mode, according to an embodiment.

FIGS. 3A and 3B show a schematic diagram of another embodiment of a CCS 200. The CCS 200 includes a climate control circuit 205. FIG. 3A shows the climate control circuit 205 in a first mode, and FIG. 3B shows the climate control circuit 205 in a second mode. In an embodiment, the CCS 200 may be a transport climate control system (e.g., the TCCS 10 in FIG. 1, etc.) to condition a climate controlled space (e.g., climate controlled space 12 in FIG. 1, etc.). In another embodiment, the CCS 200 may be a heating, ventilation, air conditioning, and refrigeration system ("HVACR") to condition climate controlled space(s) within a building.

The CCS 200 can have similar features to the CCS 100 in FIGS. 2A and 2B, except as discussed below. The CCS 200 includes the climate control circuit 205 and a climate controller 290 configured to control the climate control circuit 205. For example, as shown in FIG. 2A, the CCS 200 includes a compressor 210, a condenser 220, an intermediate heat exchanger (i.e., economizer 230), an evaporator expansion valve 240, an evaporator 250, and a second expansion valve (i.e., economizer expansion valve 236), similar to the climate control circuit 105 in FIGS. 2A-2B. The climate control circuit 205 includes an economizer 230 that is an intermediate heat exchanger, and the economizer expansion valve 236 that is a second expansion valve. The economizer expansion valve 236 may also be referred to as a bypass expansion valve.

The CCS 200 operating the climate control circuit 205 in the first mode (as shown in FIG. 3A) operates similar to climate control circuit 205 of the CCS 100 operating in the first mode (as shown in FIG. 2A). As shown in FIG. 3A, the working fluid flows from a discharge outlet 214 of the compressor 210 to the condenser 220, from the condenser 220 to the evaporator expansion valve (EXV) 240 (e.g., through the economizer 230), from the EXV 240 to the evaporator 250, and from the evaporator 250 to a suction inlet 212 of the compressor 210. The compressor 210 also includes an intermediate injection inlet 216 for supplying/injecting intermediate working fluid (e.g., intermediate pressure working fluid) into the compressor 210 (e.g., into the compression mechanism 218 of the compressor 210).

The climate control circuit 205 includes a first pathway 222 and a second pathway 224. The first pathway 222 extends from the condenser 220 to the evaporator 250. The first pathway 222 includes the EXV 240 (e.g., the first pathway 222 extends through the EXV 240). The first pathway 222 can also include the economizer 230 (e.g., the first pathway 222 extends through the economizer 230 and the EXV 240). The first pathway 222 may be the main pathway of the climate control circuit 205 that extends from the compressor 210; through the condenser 220, the EXV 240, and the evaporator 240; and back to and through the compressor 210.

The second pathway 224 extends from the first pathway 222 back to the first pathway 222. The second pathway 224 extends to the intermediate injection inlet 216 of the compressor 210. The second pathway 224 bypasses a portion of the first pathway 222. The second pathway 224 bypasses the EXV 240 and the evaporator 250. The second pathway 224 includes the economizer 230 and the economizer expansion valve 236 (e.g., the second pathway 224 extends through the economizer 230 and the economizer expansion valve 236). In the illustrated embodiment, the second pathway 224 can also be referred to as a bypass pathway or an economizer injection pathway.

The bypass pathway 224 has an inlet 226 that connects (i.e., fluidly connected) to the first pathway 222 and an outlet 228 that connects (i.e., fluidly connected) to the first pathway 222. For example, the bypass pathway 224 extends from the first pathway 222 between the condenser 220 and the EXV 240 to the first pathway 222 at the compressor 210. The inlet 226 of the bypass pathway 224 connects to the first pathway 222 downstream of the condenser 220 and upstream of the EXV 240 (e.g., upstream of the economizer 230, downstream of the economizer 230). The outlet 228 of the bypass pathway 224 connects to the first pathway 222 at the compressor 210. The outlet 228 of the bypass pathway 224 extends to the intermediate inlet 216 of the compressor 210.

The first and second pathways 222, 224 separately extend through the economizer 230. For example, the economizer 230 includes a first side 232 and a second side 234, and the first pathway 222 extends through the first side 232 of the economizer 230 and the second pathway 224 extends through the second side 234 of the economizer 230. The first pathway 222 extends through the first side 232 of the economizer 230 and the second pathway 224 extends through the second side 234 of the economizer 230. In the first mode (as shown in FIG. 3A), the second pathway 224 is closed.

In the first mode as shown in FIG. 3A, no working fluid (i.e., no substantive amount of working fluid) flows through the bypass pathway 224. In the illustrated embodiment, the controller 290 closes the second pathway 224 by closing the economizer expansion valve 236. In an embodiment, the bypass pathway 224 may include a shutoff valve (not shown) for blocking flow through the bypass pathway 224, and the bypass pathway 224 may be opened/closed by controlling the shutoff valve (i.e., closing the shutoff valve to close the bypass pathway 224). Control of flow through the bypass pathway 224 is discussed in more detail below.

FIG. 3B shows the climate control system 200 operating in the second mode. In the second mode, the working fluid flows through the bypass pathway 224. For example, relative to the first mode in FIG. 3B, the climate controller 290 opens the economizer expansion valve 236 to allow flow of working fluid through the bypass pathway 224. The second mode is selected (by the climate controller 290) based on function of the EXV 240. For example, the climate controller 290 in the second mode may be configured to adjust the bypass expansion valve 236 to a preset open position (e.g., a predetermined open position) or to adjust the bypass expansion valve 236 to a preset open position or to variable open position, as similarly discussed for the bypass expansion valve 136 in FIG. 2B. The second mode of the CCS 200 may also be referred to as a bypass mode.

In the second mode, a first portion $f_{1*}$ of the working fluid discharged from the condenser 220 flows to the EXV 240 and a second portion $f_{2*}$ of the working fluid discharged from the condenser 220 flows to the economizer expansion valve 236. For example, as shown in FIG. 3B, the first portion $f_{1*}$ of the working fluid flows through the economizer 230 (e.g., the first side 232 of the economizer 230) and the EXV 240, and second portion $f_{2*}$ of the working fluid flows through the economizer 230 (e.g., the second side 234 of the economizer 230) and the economizer expansion valve 236. In another embodiment, the inlet 226 of the bypass pathway 224 may connect to the first pathway 222 downstream of economizer 230 (e.g., as shown in dashed lines in FIG. 3B). For example, in such an embodiment, second portion $f_{2*}$ of the working fluid flows through the first side 232 of the economizer 230, the economizer expansion valve 236, and the second side 234 of the economizer 230.

The economizer expansion valve 236 expands the working fluid in the second portion $f_2$ as it passes therethrough, and the expansion causes the working fluid in the second portion $f_2$ to decrease in temperature. The first portion $f_1$ flows through the first side 232 of the economizer 230 and the second portion $f_2$ flows through the second side 234 of the economizer 230. The expanded working fluid in the second portion $f_2$ absorbs heat from the working fluid in the first portion $f_1$ which cools the working fluid in the first portion $f_1$. In the second mode in FIG. 3B, the economizer 230 cools the working fluid flowing from the condenser 220 to the EXV 240 (e.g., cools at least the first portion $f_{1*}$ of working fluid). The operation of the intermediate heat exchanger (i.e., the economizer 230) increases the subcooling of the working fluid flowing into the EXV 240. The increase in subcooling advantageously results in improved operational stability of the EXV 240.

The CCS 200 can also include a third mode that is an economizer mode. The controller 290 operates the CCS 200 in the economizer mode based on an operating demand for the CCS 200. For example, operating demand can refer to operating parameters of the climate control circuit 205 to satisfy the conditioning demand for the CCS 200 (e.g., cooling demand, heating demand). The operating parameters can include one or more of, but are not limited to, a capacity for the climate control circuit 205, an efficiency for the climate control circuit 205, and a compressor discharge temperature (e.g., a temperature of the working fluid discharged from the discharge outlet 214 of the compressor 210), etc. For example, the controller 290 can operating the CCS 200 in the economizer mode to increase capacity of the climate control circuit 205 (e.g., to meet a capacity demand for the compressor 210), to increase efficiency of the climate control circuit 205 (e.g., to meet a desired efficiency for the climate control circuit 205), and/or to decrease a compressor discharge temperature. In an embodiment, the flow through the economizer expansion valve (e.g., flow of first portion $f_{1*}$ through the economizer expansion valve 326) is substantively more in the economizer mode than in the second mode. For example, the flow through the economizer expansion valve in the second mode may only be a sufficient amount to provide stability to the evaporator expansion valve 326. In an embodiment, the flow through the economizer expansion valve in the second mode may be less than 10% of the total flow rate of working fluid discharged from the condenser 222.

The controller 290 controls flow through the bypass pathway 224 based on desired economizing of the climate control circuit 205 (e.g., based on operating demand for the CCS 200) and on functioning of the EXV 240. For example, the climate controller 290 operates in an economizer mode (i.e., a third mode) based on the operating demand. In an embodiment, the controller 290 in the economizer mode may be configured to control the economizer expansion valve 236 (e.g., control flow through the economizer expansion valve 236) based on, for example (but not limited to), superheat of the intermediate working fluid discharged from the economizer 230, compressor discharge temperature, and/or compressor discharge superheat.

The climate controller 290 can be configured to select operating the climate control circuit 205 in the economizer mode or the first mode based on the operating demand, and switches from operating in the first mode to operating in the second mode based on functioning of the EXV 240. For example, when operating in the first mode based on the operating demand (as shown in FIG. 3A), the climate controller 290 switches to operating in the second mode in response to unstable operation of the EXV 240.

FIGS. 4A-4D are graphs showing conditions for detecting unstable operation of an evaporator expansion valve. As discussed above, the controller of the climate control circuit in FIGS. 2A-2B (e.g., climate controller 190, climate controller 290) is configured to switch from a first mode to a second mode based on operation of the EXV (e.g., evaporator expansion valve 140, evaporator expansion valve 240). The controller can be configured to switch from the first mode to the second mode in response to unstable operation of the EXV (e.g., evaporator expansion valve 140, evaporator expansion valve 240). For example, the climate controller can be configured to open a bypass pathway (e.g., bypass pathway 124, bypass pathway 224) that includes the second expansion valve and an intermediate heat exchanger (e.g., intermediate heat exchanger 130, economizer 230) in response to unstable operation of the evaporator expansion valve.

Figure 4A:
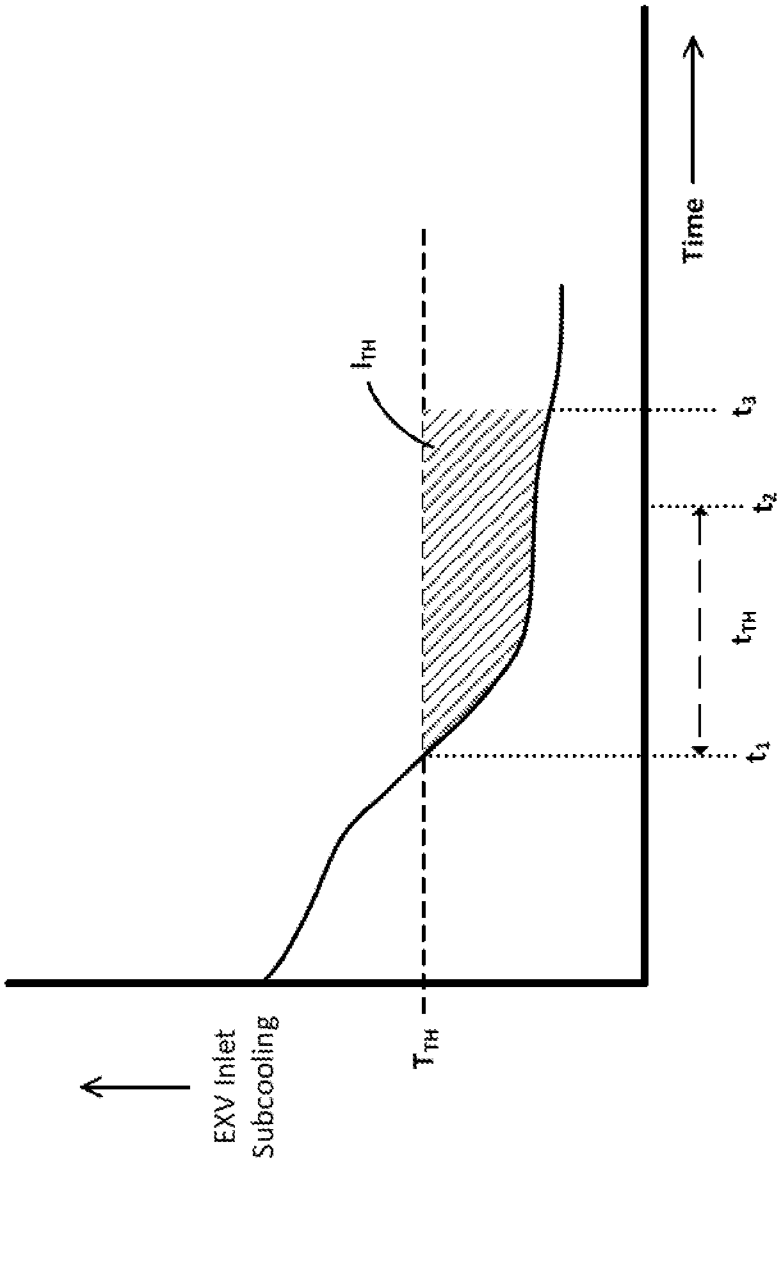
FIG. 4A is a graph of evaporator expansion valve ("EXV") subcooling vs. time including thresholds for unstable operation of an evaporator expansion valve, according to an embodiment.

Unstable operation of an EXV may be detected based on EXV inlet subcooling. EXV Inlet subcooling is the subcooling of the working fluid flowing into the EXV. FIG. 4A is a graph of EXV inlet subcooling vs. time. The climate controller may determine whether operation of the evaporator expansion valve is unstable based on a subcooling threshold $T_{TH}$ (e.g., a predetermined subcooling threshold).

In an embodiment, the climate controller can be configured to detect unstable operation of the EXV when the EXV inlet subcooling is less than the subcooling threshold $T_{TH}$.

For example, the climate controller may be configured to operate in the second mode in response to the EXV inlet subcooling being less than the subcooling threshold $T_{TH}$) (e.g., at time $t_1$ in FIG. 4A).

In an embodiment, the climate controller can be configured to detect unstable operation of the EXV when the EXV inlet subcooling is less than the subcooling threshold for a predetermined time period $t_{TH}$. For example, the climate controller may be configured to operate in the second mode when the EXV inlet subcooling is less than the subcooling threshold $T_{TH}$ for the predetermined time period $t_{TH}$ (e.g., at time $t_2$ in FIG. 4A).

In an embodiment, the climate controller can be configured to detect unstable operation of the evaporator expansion valve when based on an integral subcooling threshold $I_{TH}$ (e.g., a predetermined integral subcooling threshold). The climate controller detects unstable operation when a (continuous) integral of subcooling being less than the subcooling threshold $T_{TH}$ is greater than the integral subcooling threshold $I_{TH}$ (e.g., at time $t_3$ in FIG. 4A).

Figure 4B:
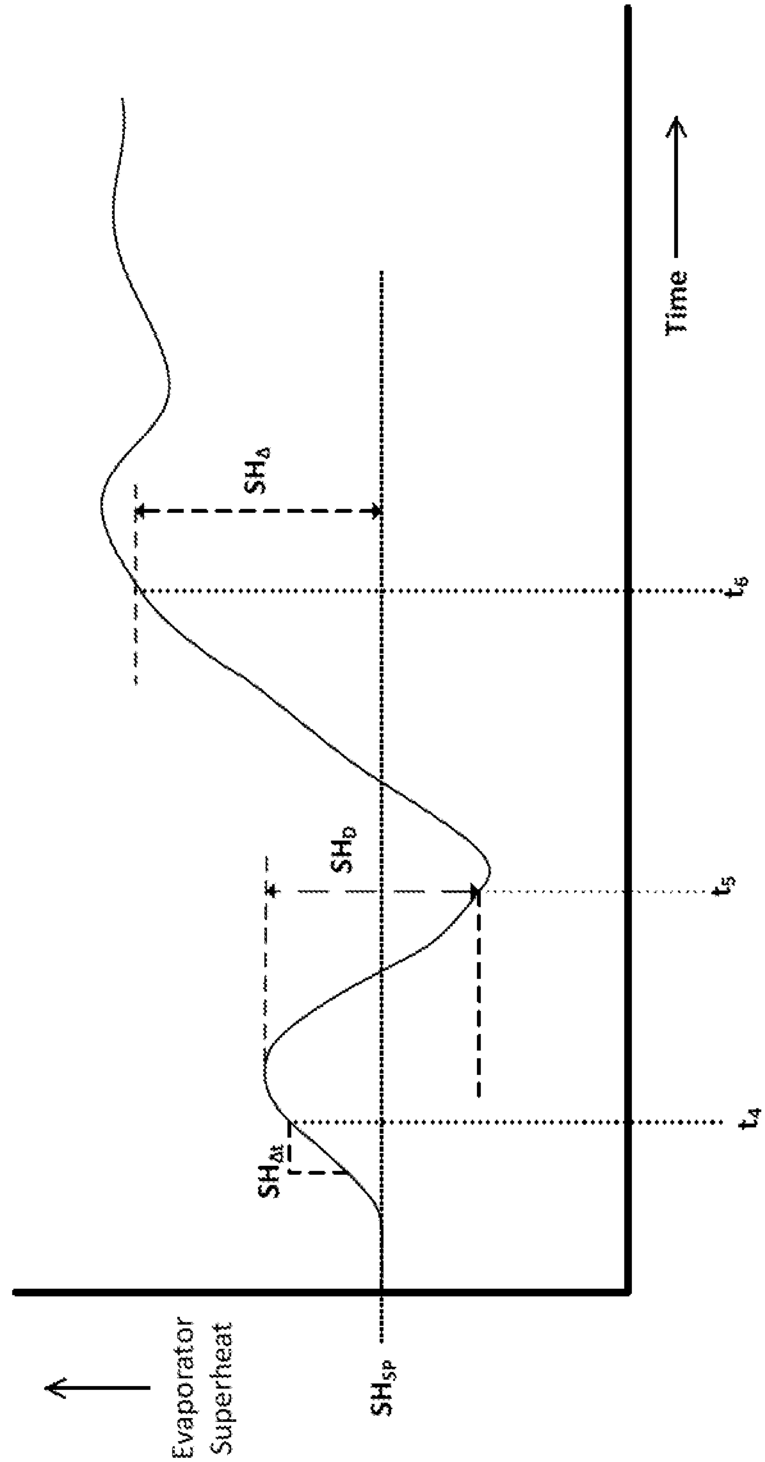
FIG. 4B is a graph of evaporator superheat vs. time including thresholds for unstable operation of an EXV, according to an embodiment.

Unstable operation of an evaporator expansion valve may be detected based on evaporator superheat. Evaporator superheat is the superheat of the working fluid discharged from the evaporator (e.g., evaporator 150, evaporator 250). FIG. 4B is a graph of evaporator superheat vs. time. The climate controller may determine whether operation of the evaporator expansion valve is unstable based on detected evaporator superheat. The climate controller can have an evaporator superheat setpoint $SH_{SP}$ (e.g., a predetermined superheat setpoint). For example, the EXV can be controlled based on adjusting the evaporator superheat to be at the evaporator superheat setpoint $SH_{SP}$.

In an embodiment, unstable operation of the evaporator expansion valve may be determined based on a rate of change ("ROC") of the evaporator superheat. The climate controller can be configured to detect unstable operation of the evaporator expansion valve when the evaporator superheat ROC exceeds an evaporator superheat ROC threshold $SH_{\Delta t}$ (e.g., a predetermined evaporator superheat ROC threshold). For example, the climate controller may be configured to operate in the second mode when evaporator superheat ROC exceeds the evaporator superheat ROC threshold $SH_{\Delta t}$ (e.g., at time $t_4$ in FIG. 4B).

In an embodiment, unstable operation of the evaporator expansion valve may be determined based on deviation of the evaporator superheat. The climate controller can be configured to detect unstable operation of the evaporator expansion valve when a standard deviation of the evaporator superheat exceeds an evaporator $SH_D$ (e.g., a predetermined evaporator superheat deviation threshold). For example, the climate controller may be configured to operate in the second mode when a deviation of the evaporator superheat exceeds the evaporator superheat deviation threshold $SH_D$ (e.g., at time $t_5$ in FIG. 4B). The deviation can be determined for a preset period. In an embodiment, the deviation may be standard deviation of the evaporator superheat. It should be appreciated that in other embodiments, the deviation may be a different type of variation measurement of the evaporator superheat (e.g., range, interquartile range, etc.) for a preset period of time.

In an embodiment, unstable operation of the evaporator expansion valve may be determined based on a difference between the evaporator superheat and the evaporator superheat setpoint $SH_{SP}$. The climate controller can be configured to detect unstable operation of the evaporator expansion valve when a difference between evaporator superheat and the evaporator superheat setpoint $SH_{SP}$ exceeds a superheat variation threshold SHA (e.g., a predetermined superheat variation threshold). For example, the climate controller may be configured to operate in the second mode when a difference between evaporator superheat and the evaporator superheat setpoint $SH_{SP}$ exceeds the superheat variation threshold SHA (e.g., at time $t_5$ in FIG. 4B). In an embodiment, the difference may be an absolute difference between evaporator superheat and the evaporator superheat setpoint $SH_{SP}$ (e.g., detected evaporator superheat-evaporator superheat setpoint). In other embodiments, this difference may be, for example (but not limited to), an integrated difference (e.g., integrated value of the difference over a preset time period), an average difference (e.g., average of the difference over a preset time period), a root-mean-square difference (e.g., a root-mean-square difference between the evaporator superheat and the evaporator superheat setpoint), etc. For example, in such embodiments, the superheat variation threshold $SH_\Delta$ would be a corresponding threshold for the type of difference between the evaporator superheat and the evaporator superheat setpoint $SH_{SP}$ (e.g., superheat variation threshold $SH_\Delta$ is a superheat absolute difference variation threshold for the difference that is absolute difference, etc.).

Figure 4C:
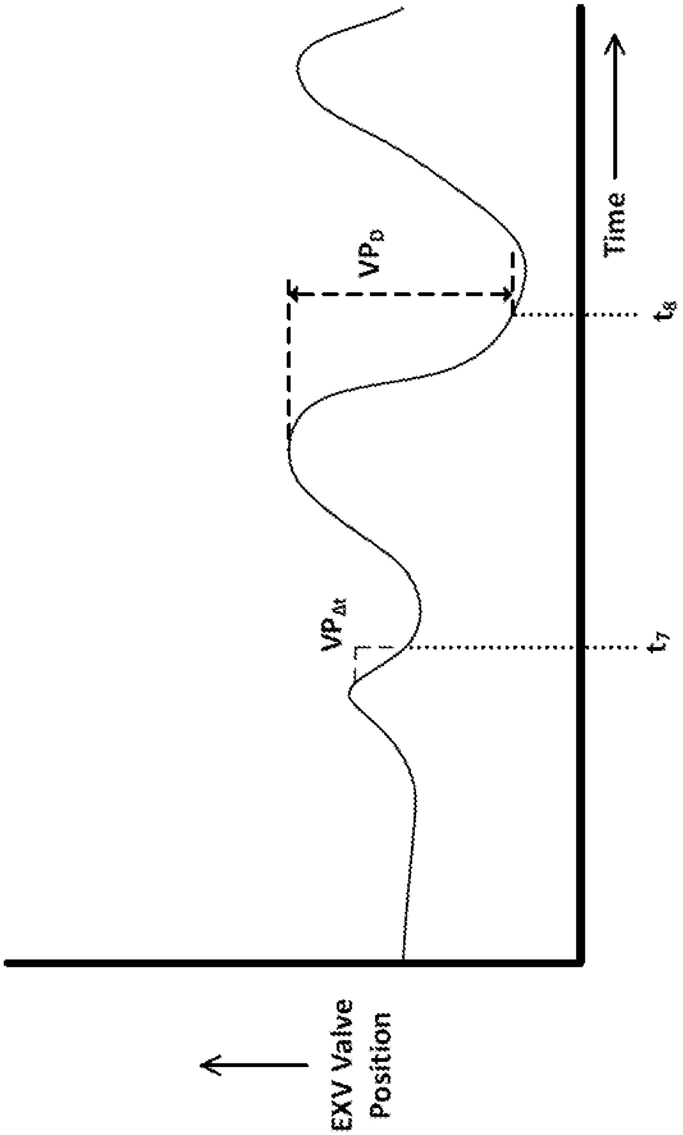
FIG. 4C is a graph of EXV valve position vs. time including thresholds for unstable operation of an EXV, according to an embodiment.

Unstable operation of an evaporator expansion valve may be detected based on evaporator expansion valve positions (e.g., VP of the EXV 140 over time, VPs of the evaporator expansion valve 240 over time). FIG. 4C is a graph of EXV valve position vs. time. The climate controller may determine whether operation of the evaporator expansion valve is unstable based on detected evaporator expansion valve positions.

In an embodiment, unstable operation of the evaporator expansion valve may be determined based on expansion valve position ROC. The climate controller can be configured to detect unstable operation of the evaporator expansion valve when a ROC in the expansion valve position exceeds a valve position ROC threshold $VP_{\Delta t}$ (e.g., a predetermined valve position ROC threshold). For example, the climate controller may be configured to operate in the second mode when the ROC in the valve position of the evaporator expansion valve exceeds the valve position ROC threshold $VP_{\Delta t}$ (e.g., at time $t_8$ in FIG. 4C).

In an embodiment, unstable operation of the evaporator expansion valve may be determined based on expansion valve position deviation. The climate controller can be configured to detect unstable operation of the evaporator expansion valve when a deviation of the expansion valve position exceeds an expansion valve position deviation threshold $VP_D$. For example, the climate controller may be configured to operate in the second mode when the deviation of the expansion valve position exceeds the expansion valve position deviation threshold $VP_D$ (e.g., at time $t_8$ in FIG. 4C). In an embodiment, the deviation may be standard deviation of the expansion valve position. It should be appreciated that in other embodiments, the deviation may be a different type of variation measurement of the expansion valve position (e.g., range, interquartile range, etc.) for a preset period of time. For example, in such embodiments, the valve position deviation threshold $VP_D$ would be a corresponding threshold for the type of difference employed (e.g., a valve position standard deviation threshold for standard deviation, etc.).

Figure 4D:
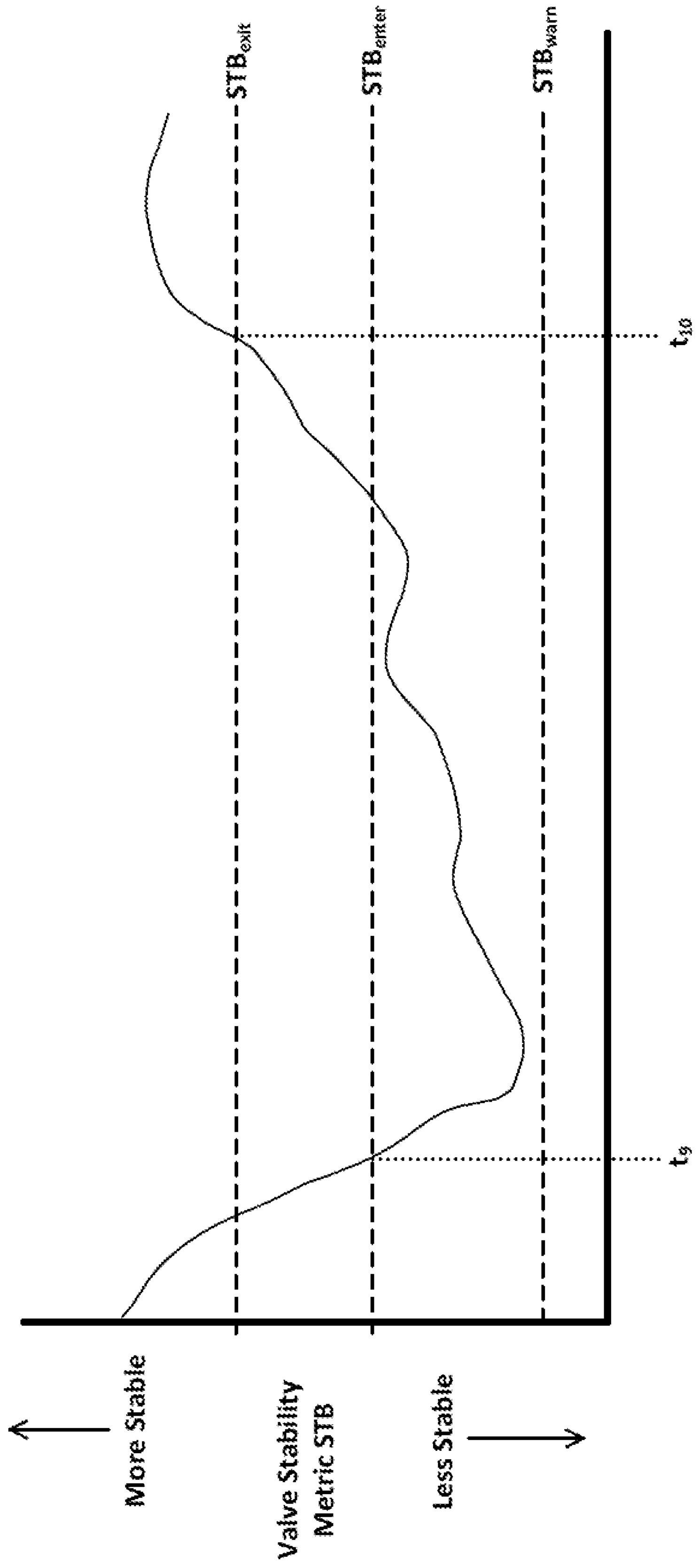
FIG. 4D is a graph of an EXV valve stability metric vs. time including thresholds for unstable operation of an EXV, according to an embodiment.

Unstable operation of an EXV may be detected based on a valve stability metric STB for the EXV. FIG. 4D is a graph of valve stability metric STB vs. time. The climate controller may determine whether operation of the evaporator expansion valve is unstable based on the valve stability metric STB for the EXV. The valve stability metric STB is an operating parameter which correlates with operating stability of the EXV (e.g., variation in valve position VP of the EXV). The valve stability metric may include, for example (but is not limited to), EXV inlet subcooling, variation or error in evaporator superheat, and/or variation in valve position.

The climate controller can be configured to detect unstable operation of the EXV when the valve stability metric STB exceeds a first threshold $STB_{enter}$ (e.g., a predetermined first stability metric threshold). The climate controller can be configured to detect the operation of the EXV as unstable until the valve stability metric STB no longer exceeds a second threshold $STB_{exit}$ (e.g., a predetermined first stability metric threshold). The first threshold $STB_{enter}$ and the second threshold are different thresholds. For example, as shown in FIG. 4D, the first threshold $STB_{enter}$ is a greater threshold than the second threshold $STB_{exit}$ (e.g., more extreme, further from stable, etc.). The two thresholds can result in a relatively higher stability for detecting the EXV operation as stable after being detected as unstable (i.e., for returning from unstable operation to stable operation) than for detecting the operation of the EXV as unstable.

The climate controller may be configured to change the climate control circuit from operating in a non-economizer mode (e.g., the first mode of the climate control circuit 105 in FIG. 2A, the first mode of the climate control circuit 205 in FIG. 3A) to operating in a bypass mode (e.g., the second mode of the CCS in FIG. 2B, the second mode of the CCS 200 in FIG. 3B) when the valve stability metric STB exceeds the first threshold $STB_{enter}$ (e.g., at time to in FIG. 4D). The climate controller can operate the climate control circuit in the bypass mode in response to the valve stability metric STB exceeding the first threshold $STB_{enter}$. The climate controller may be configured to change the climate control circuit form operating the bypass mode to operating in the non-economizer mode in response to when the valve stability metric STB no longer exceeds the second threshold $STB_{exit}$ (e.g., at time $t_{10}$ in FIG. 4D). The climate controller can return operation of the climate control circuit to the non-economizer mode in response to the valve stability metric STB no longer exceeding the second threshold $STB_{enter}$ (e.g., being at or less than the second threshold $STB_{enter}$).

In an embodiment, the climate controller may have a third threshold $STB_{warn}$ for the valve stability metric STB (e.g., a predetermined third stability metric threshold). The third stability metric threshold is an increased threshold than the first threshold $STB_{enter}$ and the second threshold $STB_{exit}$ (e.g., more extreme threshold, farther from stable, etc.). The third threshold $STB_{warn}$ is a warning threshold. The climate controller can be configured to generate an alert when the valve stability metric STB exceeds the third threshold $STB_{warn}$.

In an embodiment, the valve stability metric STB can include EXV inlet subcooling. The EXV inlet subcooling can be detected as similarly discussed for FIG. 4A. For example, valve stability decreases (i.e., becomes more unstable) with decreasing/lower EXV inlet subcooling. In such an embodiment, the valve stability metric STB can respectively exceed each threshold by the valve stability metric STB decreasing to be less than the value of the given threshold.

In an embodiment, the valve stability metric STB can include variation or error in evaporator superheat. Variation in the evaporator superheat is a measurement of change in the evaporator superheat over a period of time (e.g., over a preset period of time). The variation in the evaporator superheat can be, for example (but is not limited to), a rate of change in evaporator superheat over a period of time, a time-averaged root mean square of the evaporator superheat over a period of time, or a mean of the evaporator superheat over a period of time. Error in the evaporator superheat can be the absolute difference between the detected evaporator superheat and the evaporator superheat setpoint. For example, valve stability decreases with increasing/higher variation or error in evaporator superheat. In such an embodiment, the valve stability metric STB can respectively exceed each threshold by the valve stability metric STB increasing to be greater than the value of the given threshold (e.g., the chart in FIG. 4D being vertically flipped).

In an embodiment, the valve stability metric STB can include variation or error in valve position (e.g., valve position VP). Variation in the valve position is a measurement of change in the valve position of the EXV over a period of time (e.g., over a preset period of time). The variation in valve position can be, for example (but is not limited to), a rate of change in valve position over a period of time, a time-averaged root mean square of the valve position over a period of time, or a mean of the valve position over a period of time. For example, valve stability decreases with increasing/higher variation or error in the valve position. In such an embodiment, the valve stability metric STB can respectively exceed each threshold by the valve stability metric STB increasing to be greater than the value of the given threshold (e.g., the chart in FIG. 4D being vertically flipped).

Figure 5:
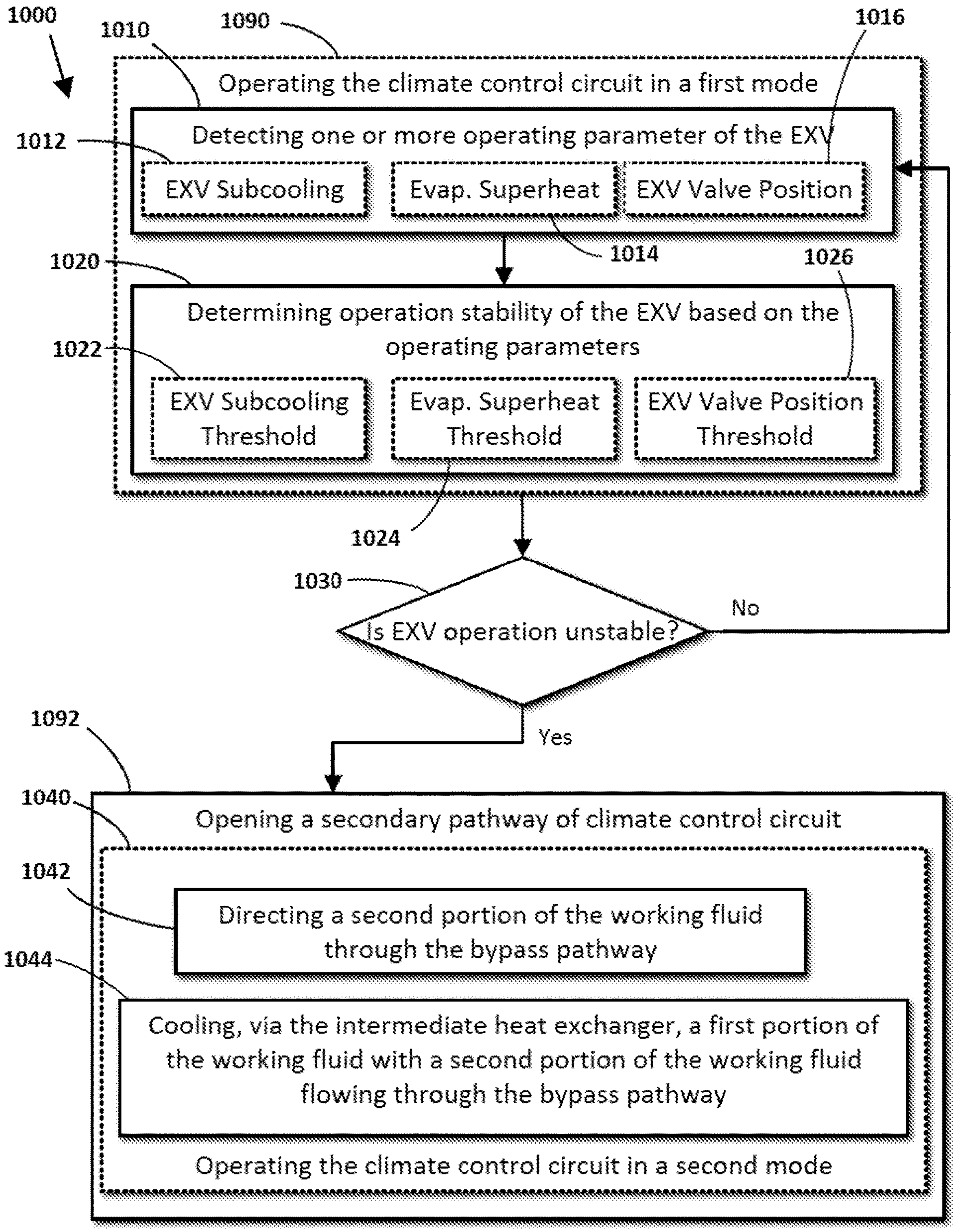
FIG. 5 is a block flow diagram of an embodiment of a method of controlling a climate control circuit.

FIG. 5 is a block flow diagram of a method 1000 of controlling a climate control circuit. The method 1000 may be employed by the climate controller 190 to control the climate control circuit 105 in FIGS. 2A-2B, may be employed by the climate controller 290 in FIGS. 3A-3B to control the climate control circuit 205, etc. For example, the climate control circuit can include a compressor (e.g., compressor 110, compressor 210), a condenser (e.g., condenser 120, condenser 220), an intermediate heat exchanger (e.g., intermediate heat exchanger 130, economizer 230), an evaporator expansion valve ("EXV") (e.g., EXV 140, EXV 240), an evaporator (e.g., evaporator 150, evaporator 250), and a second expansion valve (e.g., bypass expansion valve 136, economizer expansion valve 236). The method 1000 starts at 1010.

At 1010, one or more operational parameters of the EXV are detected. The operational parameter(s) detected at 1010 may include one or more of EXV subcooling 1012, evaporator superheat 1014, and EXV valve position 1016. The EXV subcooling 1012 is the subcooling of the working fluid flowing into the EXV. In an embodiment, the EXV subcooling 1012 can be detected by based on an EXV inlet temperature (e.g., temperature $T_1$) and an EXV inlet pressure (e.g., temperature $T_1$) For example, the EXV subcooling 1012 can be detected by detecting an EXV inlet temperature (e.g., temperature $T_1$) and an EXV inlet pressure (e.g., temperature $T_1$), determining a saturation or bubble point temperature of the working fluid based on the EXV inlet pressure, and comparing the saturation or bubble point temperature to the EXV inlet temperature (e.g., EXV subcooling temperature=EXV inlet temperature−saturation or bubble point temperature).

The evaporator superheat 1014 is the superheat of the working fluid discharged from the evaporator. In an embodiment, the EXV subcooling 1012 can be detected based on an evaporator outlet temperature (e.g., temperature $T_2$) and an evaporator outlet pressure (e.g., pressure $T_2$) for the working fluid. For example, the evaporator superheat 1014 can be detected by detecting determining a saturation or dew point temperature of the working fluid based on the evaporator outlet pressure, and comparing the saturation or dew point temperature to the evaporator outlet temperature (e.g., EXV subcooling temperature=EXV inlet temperature−saturation or dew point temperature).

The EXV valve position 1016 is the valve position of the EXV (e.g., valve position VP, the valve position corresponding to degree that the EXV is open). In an embodiment, the valve position may be detected based on operation of the EXV (e.g., can determine valve position based on adjustment history of the EXV, etc.). In another embodiment, a position sensor (not shown) may be used to detect the position of the EXV. The method 1000 then proceeds to 1020.

At 1020, operational stability of the EXV is determined based on the operational parameter(s) of the EXV detected at 1010. The operational stability of the EXV may be determined at 1020 based on comparing the operational parameter(s) of the EXV to one or more corresponding threshold(s). For example, the corresponding threshold(s) may include one or more of a subcooling threshold (e.g., subcooling threshold $T_{TH}$, integral subcooling threshold $I_{TH}$), an evaporator superheat threshold (e.g., evaporator superheat ROC threshold $SH_{\Delta t}$, evaporator superheat deviation threshold $SH_D$, evaporator superheat variation threshold $SH_\Delta$), an expansion valve position threshold (e.g., EXV valve position ROC threshold $VP_{\Delta t}$, EXV valve position standard deviation threshold $VP_D$). The method 1000 then proceeds to 1030.

At 1030, if the operation of the EXV valve is stable as determined at 1020, the method 1000 returns to 1012. For example, when the operation of the EXV valve is stable, the method 1000 continues detecting of the operating parameter(s) at 1010 and determining whether operation of the EXV is stable. At 1030, if the operation of the EXV valve is unstable (as determined at 1020), the method 1000 proceeds to 1040.

At 1040, a bypass pathway (e.g., bypass pathway 124, bypass pathway 224) of the climate control circuit is opened. The bypass pathway includes the intermediate heat exchanger and the second expansion valve. The second expansion valve is disposed in parallel with the evaporator expansion valve. For example, the bypass pathway bypasses the evaporator expansion valve. A first portion of the working fluid (e.g., first portion $f_1$, first portion $f_{1*}$) flows through the intermediate heat exchanger to the EXV valve. The opening of the bypass pathway at 1040 includes directing a second portion of the working fluid (e.g., second portion $f_2$, second portion $f_{2*}$) through the through the bypass pathway 1042. For example, the second portion of working fluid is directed to flow through the intermediate heat exchanger and the second expansion valve. The opening of the bypass pathway at 1040 includes the intermediate heat exchanger cooling the first portion of the working fluid that flows into the EXV using the second portion of the working fluid flowing through the bypass pathway.

As shown in FIG. 5, the method 1000 can include operating the climate control circuit in a first mode 1090 (e.g., climate control circuit 205 as shown in FIG. 2A, climate control circuit 205 as shown in FIG. 3A) and operating the climate control circuit in a second mode 1095 (e.g., climate control circuit 205 as shown in FIG. 2B, climate control circuit 205 as shown in FIG. 4B). The operating of the climate control circuit in the first mode 1090 can include the detecting at 1010 and the determining of the operational stability at 1020. The operating of the climate control circuit in the second mode 1090 can include the directing of the second portion through the bypass pathway at 1042 and the cooling of the first portion of the working fluid at 1044. For example, switching of the climate control circuit from that first mode to the second mode can include opening at the bypass pathway 1040.

It should be appreciated that the method 1000 may include features as discussed above with respect to the CCS 100 in FIGS. 3A-3B and/or with respect to the CCS 200 in FIGS. 4A-4B. For example, the operating of the climate control circuit in the first mode 1090 and the operating of the climate control circuit in the second mode 1092 may each include the respective circulating of the working fluid through the climate control circuit to cool a process fluid (e.g., compressing of the working fluid in the compressor, cooling the working fluid in the condenser, expanding of the working fluid in the EXV, and the evaporating of the working fluid in the evaporator to cool the process fluid). For example, the method 1000 can be employed to advantageously improve stability of the evaporator expansion valve in the climate control circuit.

Figure 6:
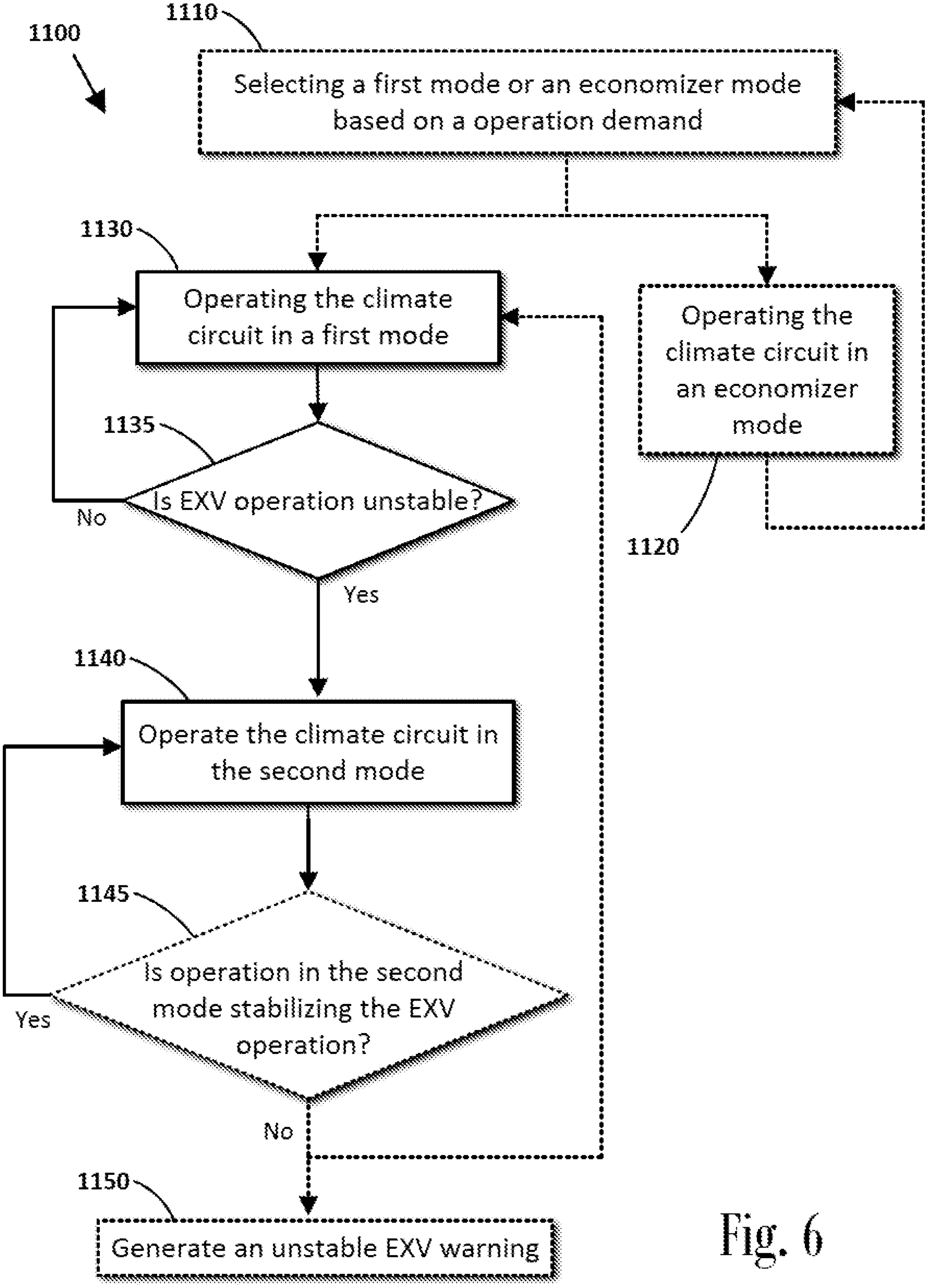
FIG. 6 is a block flow diagram of an embodiment of a method of controlling a climate control circuit.

FIG. 6 is a block flow diagram of a method 1100 of controlling a climate control circuit. The method 1100 may be employed by the climate controller 190 to control the climate control circuit 105 in FIGS. 2A-2B, may be employ by the climate controller 290 in FIGS. 3A-3B, etc. For example, the climate control circuit includes an evaporator expansion valve ("EXV") and a bypass expansion valve (e.g., bypass expansion valve 136, economizer expansion valve 236). The method 1100 can start at 1110 or 1130.

In an embodiment, the climate control circuit can include an economizer (e.g., economizer 230) for supplying intermediate working fluid to a compressor (e.g., compressor 21) of the climate control circuit. In such an embodiment, the method 1000 starts at 1110. At 1110, a first mode or an economizer mode is selected based on an operating demand for the climate control circuit. For example, the climate controller determines operation of the climate control circuit based on the operating demand, and the economizer mode is selected when the operation of the climate control includes economizer injection for the compressor.

When the economizer mode is selected, the method 1100 proceeds to 1120. At 1120, the climate control circuit is operated in the economizer mode. The climate control circuit can continue operating in the economizer mode while operation of the climate control based on the operating demand includes the economizer injection.

When the first mode is selected, the method 1100 proceeds to 1130. At 1130, the climate control circuit is operated in the first mode (e.g., first mode of the climate control circuit 105 as shown in FIG. 2A, first mode of the climate control circuit 205 as shown in FIG. 3A). In the first mode at 1130, the climate control circuit does not include an economizer or when present, the economizer is inactive (i.e., no active economizer injection). The method 1100 then proceeds to 1135.

At 1135, stability of the EXV is determined. When the EXV operation is stable, the method 1100 returns to 1130 (e.g., the climate control circuit continues operating in the first mode). When the EXV operation is unstable, the method 1100 proceeds to 1140.

At 1140, the climate control circuit is operated in the second mode (e.g., second mode of the climate control circuit 105 as shown in FIG. 2B, second mode of the climate control circuit 205 as shown in FIG. 3B). Proceeding from 1135 to 1140 can be switching of the climate control circuit from operating in the first mode to operating in the second mode. In an embodiment, 1130, 1135, and/or 1140 of the method 1100 may have features as similarly discussed for 1090, 1030, and/or 1092, respectively, in FIG. 5. The method 1110 can then proceed to 1145.

At 1145, the change in stability of the operation of the EXV is determined. For example, the change in stability of the EXV operation at 1145 may be determined based on the same operating parameter(s) as used for determining stability of the EXV operation is stable at 1135. For example, change in stability of the EXV operation at 1145 may be determined based on EXV inlet subcooling (e.g., as similarly discussed for determining EXV stability in FIG. 4A). When the second mode is stabilizing the EXV operation (e.g., stability of the EXV operation improving during the operation in the second mode), the method 1100 returns to 1140. When the operation in second mode is not stabilizing the EXV operation, the method 1110 proceeds to 1150 and/or returns to 1130. For example, the returning of the method 1110 to 1130 is switching the operation of the climate control circuit back to operating at the first mode at 1130. In returning to 1130, the method 1110 may be configured to remain operating in the first mode at 1130 until the EXV operation returns to being stable.

At 1150, an unstable EXV warning is output. The unstable EXV warning can be configured to alert a user of the CCS of the unstable operation of EXV. For example, the unstable EXV warning may be configured as an alert a servicer of the CCS. For example, the unstable EXV warning may be configured as an alert indicating the unstable operation of the EXV and that the bypass mode is not stabilizing the operation of the EXV valve. The unstable EXV warning may be an alert output to or from the climate controller. The CCS may be configured to adjust its operation to help mitigate instability of the EXV.

Figure 7:
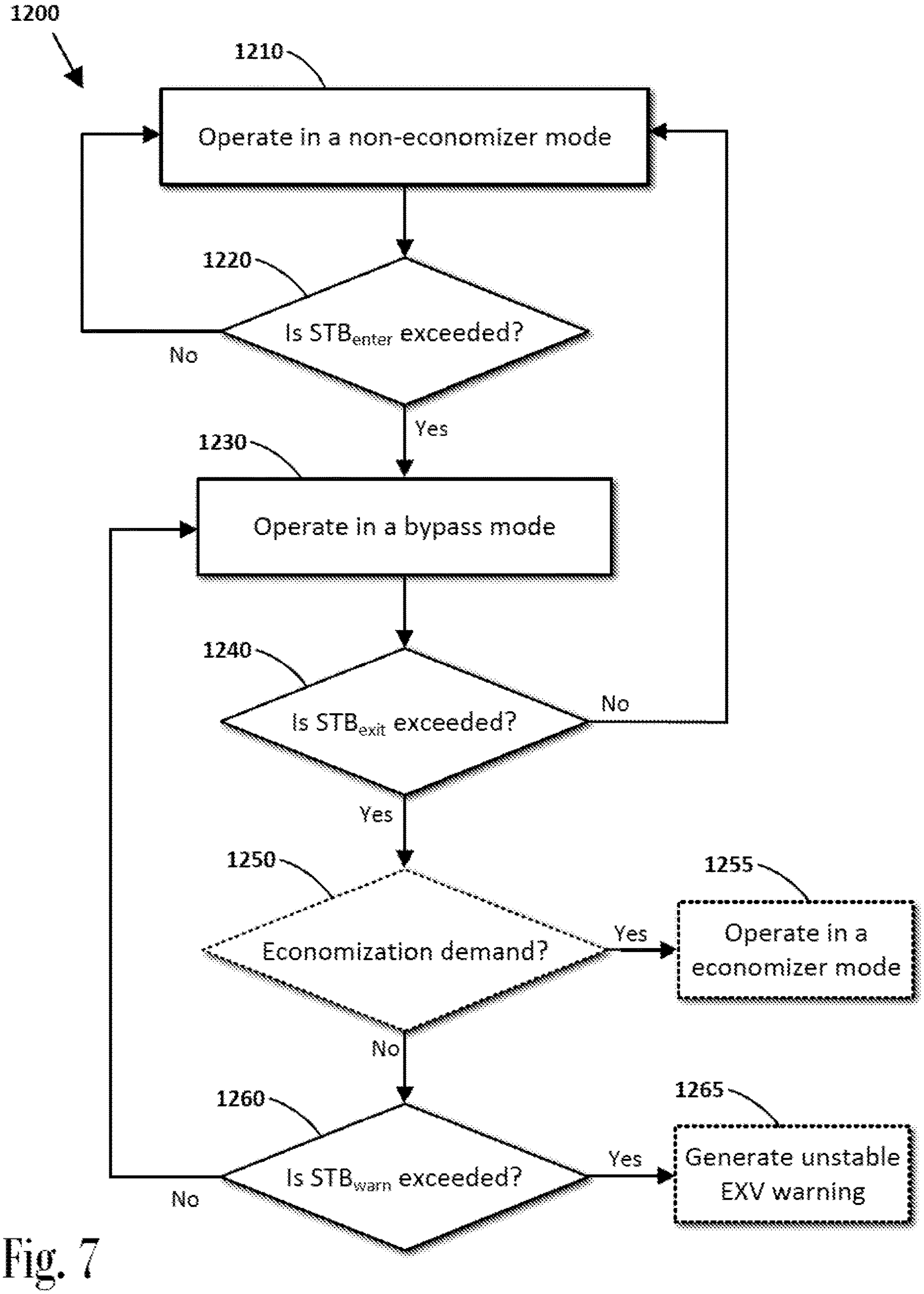
FIG. 7 is a block flow diagram of an embodiment of a method of controlling a climate control circuit.

FIG. 7 is a block flow diagram of a method 1200 of controlling a climate control circuit. The method 1200 may be employed by the climate controller 190 to control the climate control circuit 105 in FIGS. 2A-2B, may be employ by the climate controller 290 in FIGS. 3A-3B, etc. For example, the climate control circuit includes an evaporator expansion valve ("EXV") and a bypass expansion valve (e.g., bypass expansion valve 136, economizer expansion valve 236). The method 1200 can start at 1210.

At 1210, the climate control circuit is operated in a non-economizer mode (e.g., the first mode in FIG. 2A, the first mode in FIG. 3A). For example, the climate controller operates the climate control circuit in the non-economizer mode based on the operating demand for the climate control circuit/CCS. The method 1200 then proceeds to 1220.

At 1220, whether a valve stability metric STB for the EXV exceeds a first threshold $STB_{enter}$ is determined. When the valve stability metric STB exceeds the first threshold $STB_{enter}$, the method 1200 returns to 1210 (e.g., the climate control circuit continues operating in the non-economizer mode). When the valve stability metric STB exceeds the first threshold $STB_{enter}$, the method 1000 proceeds to 1230.

At 1230, the climate control circuit is operated in a bypass mode (e.g., the second mode in FIG. 2B, the second mode in FIG. 3B). For example, in response to the valve stability metric STB for the EXV exceeding the first threshold $STB_{enter}$, the climate control circuit is switched from operating in the non-economizer mode to operating in the bypass mode at 1230 (e.g., the climate control circuit enters into operating in the bypass mode). The method 1200 then proceeds to 1240.

At 1240, whether the valve stability metric STB for the EXV exceeds a second threshold $STB_{exit}$ is determined. When the valve stability metric STB is not exceeding the second threshold $STB_{exit}$, the method 1200 returns to 1210 (e.g., switches back/returns to operating in the non-economizer mode at 1210). When the valve stability metric STB still exceeds the second threshold $STB_{exit}$, the method 1000 proceeds to 1250.

In an embodiment, climate control circuit includes an intermediate heat exchanger that is an economizer (e.g., economizer 230), and the bypass expansion valve is an economizer expansion valve (e.g., economizer expansion valve 236). At 1250, when there is an economization demand, the method proceeds to 1255. At 1250, when there is no economizer demand, the method 1200 proceeds to 1260. At 1255, the climate control circuit operates in an economizer mode. For example, the climate control circuit can be configured to in response for economizer demand, change the climate control circuit to operating in the economizer mode at 1255.

At 1260, whether the valve stability metric STB for the EXV exceeds a third threshold $STB_{exit}$ is determined. When the valve stability metric STB does not exceed the third threshold $STB_{warn}$, the method 1200 returns back to 1230 (e.g., the climate control circuit continues operating in the bypass mode). When the valve stability metric STB exceeds the third threshold $STB_{warn}$, the method 1200 proceeds to 1265.

At 1265, an unstable EXV warning is output. In an embodiment, 1265 in FIG. 7 can be similar to 1150 in FIG. 7. After outputting the unstable EXV warning at 1265, the method 1200 may continue operating in the bypass mode (e.g., return back to 1230). In another embodiment, after outputting the unstable EXV warning at 1265, the method 1200 may return to operating in the non-economizer mode (e.g., return back to 1210).

It should be appreciated that in other embodiments, the method 1000 in FIG. 5, method 1100 in FIG. 6, and/or the method 1200 in FIG. 7 may include features as discussed above with respect to the CCS 100 in FIGS. 2A-2B and/or with respect to the CCS 200 in FIGS. 3A-3B. For example, the operating of the climate control circuit in the first/non-economizer mode at 1090 and/or at 1130 and/or at 1210 and the operating of the climate control circuit in the second/by pass mode at 1095 and/or at 1140 and/or at 1230 may each include the respective circulating of the working fluid through the climate control circuit to cool a process fluid (e.g., compressing of the working fluid in the compressor, cooling the working fluid in the condenser, expanding of the working fluid in the EXV, and the evaporating of the working fluid in the evaporator to cool the process fluid). For example, the methods 1000, 1100 may be employed to advantageously improve stability of the EXV in the climate control circuit.

Aspects:

Any of Aspects 1-11 may be combined with any of aspects 12-20.

Aspect 1. A method of controlling a climate control circuit, comprising: detecting one or more operating parameters of an evaporator expansion valve ("EXV") in the climate control circuit; determining operation stability of the EXV based on the one or more operating parameters of the EXV; in response to determining the operation of the EXV is unstable, opening a bypass pathway that includes an intermediate heat exchanger and a second expansion valve disposed in parallel with the first expansion valve, which includes the intermediate heat exchanger cooling a first portion of the working fluid flowing into the EXV using a second portion of the working fluid flowing through the bypass pathway.

Aspect 2. The method of Aspect 1, further comprising: operating the climate control circuit in a first mode, which includes the detecting of the one or more operating parameters of an evaporator expansion valve, and the determining operation stability of the EXV based on the operation parameters of the EXV, the bypass pathway being closed in the first mode; operating climate control circuit in a second mode, the bypass pathway being open in the second mode; and switching the climate control circuit from operating in the first mode to the operating in second mode, the switching including the opening of the bypass pathway.

Aspect 3. The method of Aspect 2, further comprising: operating the climate control circuit in a third mode that is an economizer mode, which includes: suppling the first portion of the working fluid through the bypass pathway to an intermediate injection inlet of a compressor of the climate control circuit, and controlling an economizer expansion valve in the bypass pathway based on a superheat of the first portion of the working discharged from an economizer in the bypass pathway.

Aspect 4. The method of any one of Aspects 1-3, wherein the opening of the bypass pathway includes directing a first portion of the working fluid discharged from the condenser through the intermediate heat exchanger, directing a second portion of the working fluid discharged from the condenser through the second expansion valve and the intermediate expansion valve in the bypass passageway.

Aspect 5. The method of any one of Aspects 1-4, wherein the one or more operating parameters include one or more of: EXV subcooling, evaporator superheat, and EXV valve position.

Aspect 6. The method of any one of Aspects 1-5, wherein the determining of operation stability of the EXV based on the one or more operating parameters of the EXV includes comparing the one or more operating parameters of the EXV to one or more corresponding thresholds.

Aspect 7. The method of Aspect 6, wherein the one or more corresponding thresholds include one or more of: an EXV subcooling threshold, an evaporator superheat threshold, an EXV valve position threshold.

Aspect 8. The method of any one of Aspects 6 and 7, wherein the one or more corresponding thresholds include one or more of: a rate of change threshold, a deviation threshold, a variation threshold, and an integral subcooling threshold.

Aspect 9. The method of any one of Aspects 1-8, wherein the climate control circuit includes: a first pathway extending from the condenser to the EXV, and the bypass pathway, the bypass pathway having an inlet connected to the first pathway downstream of the condenser and upstream of the EXV and an outlet connected to the first pathway downstream of the condenser and at or upstream of the compressor.

Aspect 10. The method of Aspect 9, wherein the outlet of bypass passageway connects to the first pathway downstream of the EXV and upstream of the compressor.

Aspect 11. The method of any one of Aspects 1-10, wherein the intermediate heat exchanger is an economizer, and the bypass pathway includes an outlet that supplies working fluid to an intermediate injection inlet of the compressor.

Aspect 12. A climate control system for conditioning a climate controlled space, comprising: a climate control circuit including a compressor, a condenser, an intermediate heat exchanger, an evaporator expansion valve ("EXV"), an evaporator, and a second expansion valve, a working fluid flowing through the climate control circuit; one or more sensors for the climate control circuit; and a climate controller to control the climate control circuit, the climate controller configured to: detect, via the one or more sensors, one or more operating parameters of the EXV in the climate control circuit; determine operation stability of the EXV based on the one or more operating parameters of the EXV; in response to determining the operation of the EXV is unstable, open a bypass pathway that includes the intermediate heat exchanger and the second expansion valve disposed in parallel with the evaporator expansion valve, such that the intermediate heat exchanger cools a first portion of the working fluid flowing into the EXV using a second portion of the working fluid flowing through the bypass pathway.

Aspect 13. The climate control system of Aspect 12, wherein the controller is configured to: operate climate control circuit in a first mode, which includes the detecting of the one or more operating parameters of an evaporator expansion valve, the bypass pathway being closed in the first mode, and the determining operation stability of the EXV based on the operation parameters of the EXV, operating climate control circuit in a second mode, the bypass pathway being open in the second mode, and switch the climate control circuit from operating in the first mode to the operating in second mode in the response to determining the operation of the EXV is unstable, the switching including the opening of the bypass pathway.

Aspect 14. The climate control system of Aspect 13, wherein the controller is configured to operate the climate control circuit in a third mode that is an economizer mode, which includes: the first portion of the working fluid being supplied through the bypass pathway to an intermediate injection inlet of a compressor of the climate control circuit, and an economizer expansion valve in the bypass pathway being controlled based on a superheat of the first portion of the working discharged from an economizer in the bypass pathway.

Aspect 15. The climate control system of any one of Aspects 12-14, wherein the opening of the bypass pathway includes directing a first portion of the working fluid discharged from the condenser through the intermediate heat exchanger, directing a second portion of the working fluid discharged from the condenser through the second expansion valve and the intermediate expansion valve in the bypass passageway.

Aspect 16. The climate control system of any one of Aspects 12-15, wherein the one or more operating parameters include one or more of EXV subcooling, evaporator superheat, and EXV valve position.

Aspect 17. The climate control system of any one of Aspects 12-16, wherein the climate controller is configured to compare the one or more operating parameters of the EXV to one or more corresponding thresholds, in order to determine the operation stability of the EXV based on the one or more operating parameters of the EXV.

Aspect 18. The climate control system of Aspect 17, wherein the one or more corresponding thresholds include one or more of an EXV subcooling threshold, an evaporator superheat threshold, and an EXV valve position threshold.

Aspect 19. The climate control system of any one of Aspects 17 and 18, wherein the one or more corresponding thresholds include one or more of a rate of change threshold, a deviation threshold, a variation threshold, and an integral subcooling threshold.

Aspect 20. The method of claim 1, wherein the climate control circuit includes: a first pathway extending from the condenser to the EXV, and the bypass pathway, the bypass pathway having an inlet connected to the first pathway downstream of the condenser and upstream of the EXV and an outlet connected to the first pathway downstream of the condenser and at or upstream of the compressor.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. In an embodiment, "connected" and "connecting" as described herein can refer to being "directly connected" and "directly connecting".

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method of controlling a climate control circuit, comprising:

detecting one or more operating parameters of an evaporator expansion valve ("EXV") in the climate control circuit;

determining operation stability of the EXV based on the one or more operating parameters of the EXV; and in response to determining the operation of the EXV is unstable, opening a bypass pathway that includes an intermediate heat exchanger and a second expansion valve disposed in parallel with the EXV, which includes the intermediate heat exchanger cooling a first portion of working fluid flowing into the EXV using a second portion of the working fluid flowing through the bypass pathway.

2. The method of claim 1, further comprising:

operating the climate control circuit in a first mode, which includes the detecting of the one or more operating parameters of the EXV, and the determining operation stability of the EXV based on the operation parameters of the EXV, the bypass pathway being closed in the first mode;

operating the climate control circuit in a second mode, the bypass pathway being open in the second mode; and switching the climate control circuit from operating in the first mode to the operating in the second mode, the switching including the opening of the bypass pathway.

3. The method of claim 2, further comprising:

operating the climate control circuit in a third mode that is an economizer mode, which includes: suppling the first portion of the working fluid through the bypass pathway to an intermediate injection inlet of a compressor of the climate control circuit, and controlling the second expansion valve that is an economizer expansion valve based on a superheat of the first portion of the working fluid discharged from an economizer in the bypass pathway.

4. The method of claim 1, wherein the opening of the bypass pathway includes directing a first portion of the working fluid discharged from a condenser of the climate control circuit through the intermediate heat exchanger, directing a second portion of the working fluid discharged from the condenser through the second expansion valve and the intermediate heat exchanger in the bypass pathway.

5. The method of claim 1, wherein the one or more operating parameters include one or more of an EXV subcooling, an evaporator superheat, and an EXV valve position.

6. The method of claim 1, wherein the determining of operation stability of the EXV based on the one or more operating parameters of the EXV includes comparing the one or more operating parameters of the EXV to one or more corresponding thresholds.

7. The method of claim 6, wherein the one or more corresponding thresholds include one or more of an EXV subcooling threshold, an evaporator superheat threshold, and an EXV valve position threshold.

8. The method of claim 6, wherein the one or more corresponding thresholds include one or more of a rate of change threshold, a deviation threshold, a variation threshold, and an integral subcooling threshold.

9. The method of claim 1, wherein the climate control circuit includes:

a first pathway extending from a condenser of the climate control circuit to the EXV, and the bypass pathway, the bypass pathway having an inlet connected to the first pathway downstream of the condenser and upstream of the EXV and an outlet connected to the first pathway downstream of the condenser and at or upstream of a compressor of the climate control circuit.

10. The method of claim 9, wherein the outlet of bypass pathway connects to the first pathway downstream of the EXV and upstream of the compressor.

11. The method of claim 1, wherein the intermediate heat exchanger is an economizer, and the bypass pathway includes an outlet that supplies working fluid to an intermediate injection inlet of a compressor of the climate control circuit.

12. A climate control system for conditioning a climate controlled space, comprising:

a climate control circuit including a compressor, a condenser, an intermediate heat exchanger, an evaporator expansion valve ("EXV"), an evaporator, and a second expansion valve, a working fluid flowing through the climate control circuit;

one or more sensors for the climate control circuit; and a climate controller to control the climate control circuit, the climate controller configured to:

detect, via the one or more sensors, one or more operating parameters of the EXV;

determine operation stability of the EXV based on the one or more operating parameters of the EXV; and in response to determining the operation of the EXV is unstable, open a bypass pathway that includes the intermediate heat exchanger and the second expansion valve disposed in parallel with the EXV, such that the intermediate heat exchanger cools a first portion of the working fluid flowing into the EXV using a second portion of the working fluid flowing through the bypass pathway.

13. The climate control system of claim 12, wherein the controller is configured to:

operate the climate control circuit in a first mode, which includes the detecting of the one or more operating parameters of the EXV, and the determining operation stability of the EXV based on the operation parameters of the EXV, the bypass pathway being closed in the first mode, operating the climate control circuit in a second mode, the bypass pathway being open in the second mode, and switch the climate control circuit from operating in the first mode to the operating in the second mode in the response to determining the operation of the EXV is unstable, the switching including the opening of the bypass pathway.

14. The climate control system of claim 13, wherein the climate controller is configured to:

operate the climate control circuit in a third mode that is an economizer mode, which includes: the first portion of the working fluid being supplied through the bypass pathway to an intermediate injection inlet of the compressor of the climate control circuit, and the second expansion valve being an economizer expansion valve controlled based on a superheat of the first portion of the working fluid discharged from an economizer in the bypass pathway.

15. The climate control system of claim 12, wherein the opening of the bypass pathway includes directing a first portion of the working fluid discharged from the condenser through the intermediate heat exchanger, directing a second portion of the working fluid discharged from the condenser through the second expansion valve and the intermediate heat exchanger in the bypass pathway.

16. The climate control system of claim 12, wherein the one or more operating parameters include one or more of an EXV subcooling, an evaporator superheat, and an EXV valve position.

17. The climate control system of claim 12, wherein the climate controller is configured to compare the one or more operating parameters of the EXV to one or more corresponding thresholds, in order to determine the operation stability of the EXV based on the one or more operating parameters of the EXV.

18. The climate control system of claim 17, wherein the one or more corresponding thresholds include one or more of an EXV subcooling threshold, an evaporator superheat threshold, and an EXV valve position threshold.

19. The climate control system of claim 17, wherein the one or more corresponding thresholds include one or more of a rate of change threshold, a deviation threshold, a variation threshold, and an integral subcooling threshold.

20. The climate control system of claim 12, wherein the climate control circuit includes:

a first pathway extending from the condenser to the EXV, and the bypass pathway, the bypass pathway having an inlet connected to the first pathway downstream of the condenser and upstream of the EXV and an outlet connected to the first pathway downstream of the condenser and at or upstream of the compressor.

* * * * *